US012801156B2

(12) United States Patent
Hatori et al.

(10) Patent No.: US 12,801,156 B2
(45) Date of Patent: Nov. 17, 2026

(54) ROUTE GENERATION METHOD

(71) Applicant: HONDA MOTOR CO., LTD., Tokyo (JP)

(72) Inventors: Satoshi Hatori, Saitama (JP); Wei Song, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 18/687,316

(22) PCT Filed: Aug. 31, 2021

(86) PCT No.: PCT/JP2021/032033
§ 371 (c)(1),
(2) Date: Feb. 28, 2024

(87) PCT Pub. No.: WO2023/032061
PCT Pub. Date: Mar. 9, 2023

(65) Prior Publication Data
US 2024/0370035 A1 Nov. 7, 2024

(51) Int. Cl.
*G05D 1/644* (2024.01)
*G05D 1/667* (2024.01)

(52) U.S. Cl.
CPC ........... *G05D 1/6445* (2024.01); *G05D 1/667* (2024.01)

(58) Field of Classification Search
None
See application file for complete search history.

(56) References Cited

U.S. PATENT DOCUMENTS

2006/0155436 A1 7/2006 Matsunaga
2016/0232786 A1 8/2016 Harasaki
2019/0195638 A1* 6/2019 Tajammul .......... G01C 21/3453
2020/0151668 A1 5/2020 Gu et al.
2020/0286033 A1* 9/2020 Ur ........................ G06Q 10/083
2021/0025715 A1* 1/2021 Benjamin .............. G06Q 50/40
(Continued)

FOREIGN PATENT DOCUMENTS

JP 2006-195969 A 7/2006
JP 2007-293551 A 11/2007
JP 2012-230523 A 11/2012
(Continued)

OTHER PUBLICATIONS

Oct. 19, 2021, International Search Opinion issued for related PCT Application No. PCT/JP2021/032033.
(Continued)

*Primary Examiner* — Davin Seol
(74) *Attorney, Agent, or Firm* — Paratus Law Group, PLLC

(57) ABSTRACT

An operation management device (20) generates a route along which an autonomous mobile robot (10) travels from a departure point(S) and passes through delivery destinations (N1) to (N12) by moving. A processor (21) of the operation management device (20) acquires the order of the delivery destinations (N1) to (N12) for passing through the delivery destinations (N1) to (N12) by a shortest route. The processor (21) further generates a route for passing through the delivery destinations (N1) to (N12) by moving multiple times from the departure point(S), based on the acquired order.

9 Claims, 18 Drawing Sheets

(56) References Cited

U.S. PATENT DOCUMENTS

| | | | | |
|---|---|---|---|---|
| 2022/0364866 | A1* | 11/2022 | Williams | G01C 21/20 |

FOREIGN PATENT DOCUMENTS

| | | | | | |
|---|---|---|---|---|---|
| JP | 2016-081378 | A | | 5/2016 | |
| JP | 2019-020770 | A | | 2/2019 | |
| JP | 2019-021220 | A | | 2/2019 | |
| JP | 2021043505 | A | * | 3/2021 | |
| WO | WO-2019181895 | A1 | * | 9/2019 | G08G 5/00 |

OTHER PUBLICATIONS

Oct. 19, 2021, Translation of International Search Report issued for related PCT Application No. PCT/JP2021/032033.

* cited by examiner

ROUTE GENERATION METHOD

CROSS REFERENCE TO PRIOR APPLICATION

This application is a National Stage Patent Application of PCT International Patent Application No. PCT/JP2021/032033 (filed on Aug. 31, 2021) under 35 U.S.C. § 371, which is hereby incorporated by reference in its entirety.

TECHNICAL FIELD

The present disclosure relates to a route generation method.

BACKGROUND ART

In an autonomous mobile robot in the related art that moves to an instructed target position while avoiding a fixed object, it is known that an obstacle database in which a position of the fixed object detected based on visual information of the robot is recorded on a map is created, and a movement route is programmed with reference to the map. Patent Literature 1 describes that a movement route generation device of an autonomous mobile robot calculates a route having a shortest distance from a current position to a destination.

CITATION LIST

Patent Literature

Patent Literature 1: JP2006-195969A

SUMMARY OF INVENTION

Technical Problem

For example, there is work in which a worker moves together with the autonomous mobile robot, such as the autonomous mobile robot delivering an article to a plurality of delivery destinations, and the worker (a person or a robot) unloading the article from the autonomous mobile robot at each delivery destination. Here, for example, it is assumed that the autonomous mobile robot needs to return to a loading point of the article in the middle of delivery due to a restriction on the quantity of articles that the autonomous mobile robot can load at one time, but the worker does not need to return to the loading point. In this case, a shortest route of the autonomous mobile robot going around each delivery destination while returning to the loading point may be different from a shortest route of the worker going around each delivery destination without passing through the loading point.

However, in the related art, since the autonomous mobile robot calculates the shortest route, the order in which the autonomous mobile robot goes around each delivery destination is not limited to the order in which the worker can go around each delivery destination by the shortest distance. Therefore, movement time of the worker becomes long, and as a result, efficiency of the entire work using the autonomous mobile robot may decrease. For example, a period of time from when the autonomous mobile robot arrives at the delivery destination to when the worker arrives at the delivery destination and starts the work becomes long, and time required for the entire work may become long. Further, in a case where the worker is a person, fatigue of the worker increases as the movement time of the worker increases.

The present disclosure provides a route generation method capable of improving efficiency of work in which a moving body and a worker cooperate with each other.

Solution to Problem

An aspect of the present disclosure relates to a route generation method for generating a route along which a moving body travels from a departure point and passes through a plurality of destination points, the route generation method causing a computer to execute:

a first step of acquiring an order of the plurality of destination points for passing through the plurality of destination points by a shortest route; and a second step of generating a route of the moving body for passing through the plurality of destination points by moving multiple times from the departure point, based on the order acquired in the first step.

Advantageous Effects of Invention

According to the above aspect of the present disclosure, it is possible to improve efficiency of work in which a moving body and a worker cooperate with each other.

BRIEF DESCRIPTION OF DRAWINGS

Exemplary embodiments of the present invention will be described in detail based on the following figures, wherein.

DESCRIPTION OF EMBODIMENTS

Hereinafter, embodiments of a route generation method of the present disclosure will be described with reference to the accompanying drawings.

EMBODIMENTS

Hereinafter, an operation system 100 as an embodiment of an operation system to which a route generation method of the present disclosure is applied will be described with reference to the accompanying drawings.

<Operation System 100>

Figure 1:
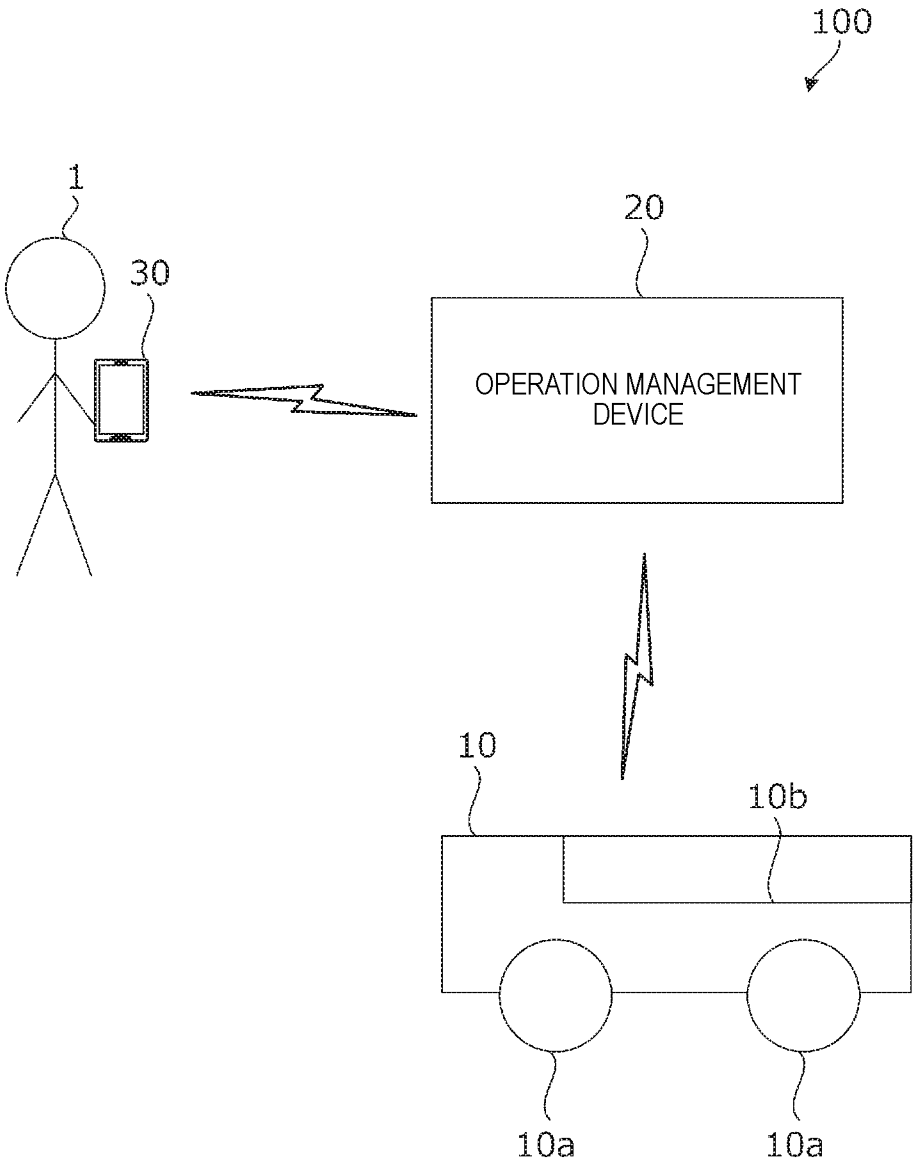
FIG. 1 is a diagram illustrating an example of an operation system 100.

FIG. 1 is a diagram illustrating an example of the operation system 100. The operation system 100 includes an autonomous mobile robot 10, an operation management device 20, and a user terminal 30.

The autonomous mobile robot 10 is an example of a moving body that is autonomously movable. The autonomous movement is a movement that is not controlled by a person, and includes, for example, a movement controlled by an external device (for example, the operation management device 20) capable of communicating with the autonomous mobile robot 10.

As illustrated in FIG. 1, the autonomous mobile robot 10 includes wheels 10*a* and a carrier 10*b*. The wheels 10*a* are a moving mechanism for the autonomous mobile robot 10 to move, and are provided, for example, at four locations of a housing of the autonomous mobile robot 10. The wheels 10*a* are driven by an actuator such as a motor unit provided in the housing of the autonomous mobile robot 10, and enable the autonomous mobile robot 10 to travel and change its direction. The carrier 10*b* can load articles, and the autonomous mobile robot 10 can autonomously move in a state where the articles are loaded on the carrier 10*b*.

The operation management device 20 is a device that manages an operation by the autonomous movement of the autonomous mobile robot 10. For example, the operation management device 20 controls an operation of the autonomous mobile robot 10 based on a delivery request from the user terminal 30.

The delivery request is a control signal for instructing delivery. The delivery request includes, for example, information such as a loading point at which an article is loaded onto the autonomous mobile robot 10, a delivery destination of the article by the autonomous mobile robot 10, the quantity of articles to be delivered to each delivery destination by the autonomous mobile robot 10, and a return point of the autonomous mobile robot 10. The operation management device 20 may transmit a control result or the like of the operation of the autonomous mobile robot 10 to the user terminal 30.

The user terminal 30 is an information terminal possessed by a supervisor 1 who supervises the operation of the autonomous mobile robot 10 in the operation system 100. The user terminal 30 transmits a delivery request to the operation management device 20 in accordance with, for example, an operation from the supervisor 1. The user terminal 30 may output the control result or the like received from the operation management device 20 to the supervisor 1.

In the example of FIG. 1, the user terminal 30 is a tablet terminal, but the user terminal 30 is not limited to the tablet terminal, and may be an information terminal such as a smartphone or a laptop personal computer (PC).

<Hardware Configuration of Autonomous Mobile Robot 10>

Figure 2:
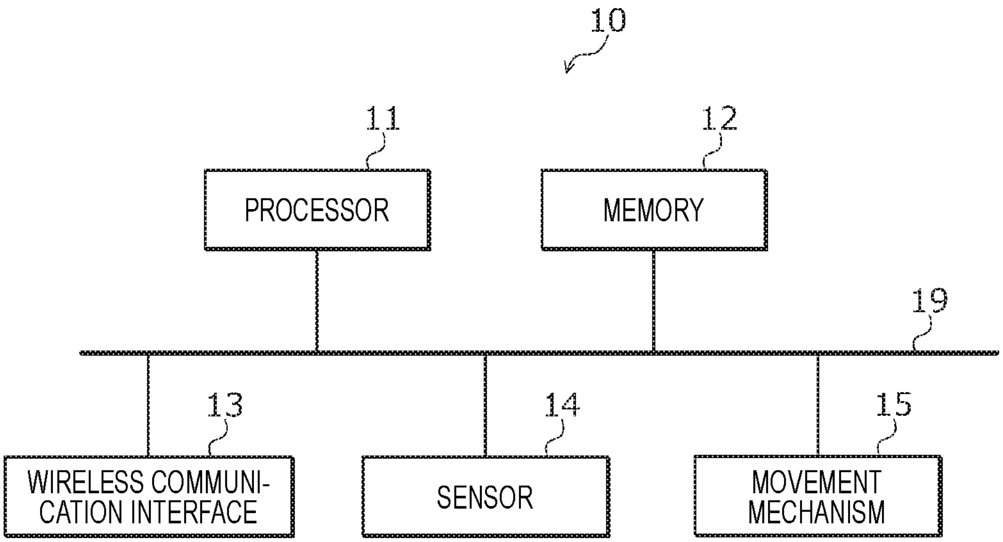
FIG. 2 is a diagram illustrating an example of a hardware configuration of an autonomous mobile robot 10.

FIG. 2 is a diagram illustrating an example of a hardware configuration of the autonomous mobile robot 10. For example, as illustrated in FIG. 2, the autonomous mobile robot 10 illustrated in FIG. 1 includes a processor 11, a memory 12, a wireless communication interface 13, a sensor 14, and a moving mechanism 15. The processor 11, the memory 12, the wireless communication interface 13, the sensor 14, and the moving mechanism 15 are connected by, for example, a bus 19.

The processor 11 is a circuit that performs signal processing, and is, for example, a central processing unit (CPU) that controls the entire autonomous mobile robot 10. The processor 11 may be implemented by another digital circuit such as a field programmable gate array (FPGA) or a digital signal processor (DSP). The processor 11 may be achieved by combining a plurality of digital circuits.

The memory 12 includes, for example, a main memory and an auxiliary memory. The main memory is, for example, a random access memory (RAM). The main memory is used as a work area of the processor 11.

The auxiliary memory is a nonvolatile memory such as a magnetic disk, an optical disk, or a flash memory. The auxiliary memory stores various programs for operating the autonomous mobile robot 10. The programs stored in the auxiliary memory are loaded into the main memory and executed by the processor 11.

The auxiliary memory may include a portable memory detachable from the autonomous mobile robot 10. Examples of the portable memory include a memory card such as a universal serial bus (USB) flash drive and a secure digital (SD) memory card, and an external hard disk drive.

The wireless communication interface 13 is a communication interface that performs wireless communication with the outside (for example, the operation management device 20) of the autonomous mobile robot 10. The wireless communication interface 13 is controlled by the processor 11.

The sensor 14 includes various sensors capable of acquiring information on the outside of the autonomous mobile robot 10, information on a moving state of the autonomous mobile robot 10, and the like. The sensor 14 is controlled by the processor 11, and sensing data of the sensor 14 is acquired by the processor 11. A specific example of the sensor 14 will be described with reference to FIG. 5.

The moving mechanism 15 is a mechanism for the autonomous mobile robot 10 to autonomously move. For example, the wheel 10*a* is the wheel 10*a* illustrated in FIG. 1. However, the moving mechanism 15 is not limited to the wheels 10*a*, and may be walking legs or the like. The moving mechanism 15 is controlled by the processor 11. In the following example, the moving mechanism 15 is assumed as the wheels 10*a*. Although not illustrated, the autonomous mobile robot 10 includes a secondary battery, and autonomous moves by driving the moving mechanism 15 with electric power obtained from the secondary battery.

<Hardware Configuration of Operation Management Device 20>

Figure 3:
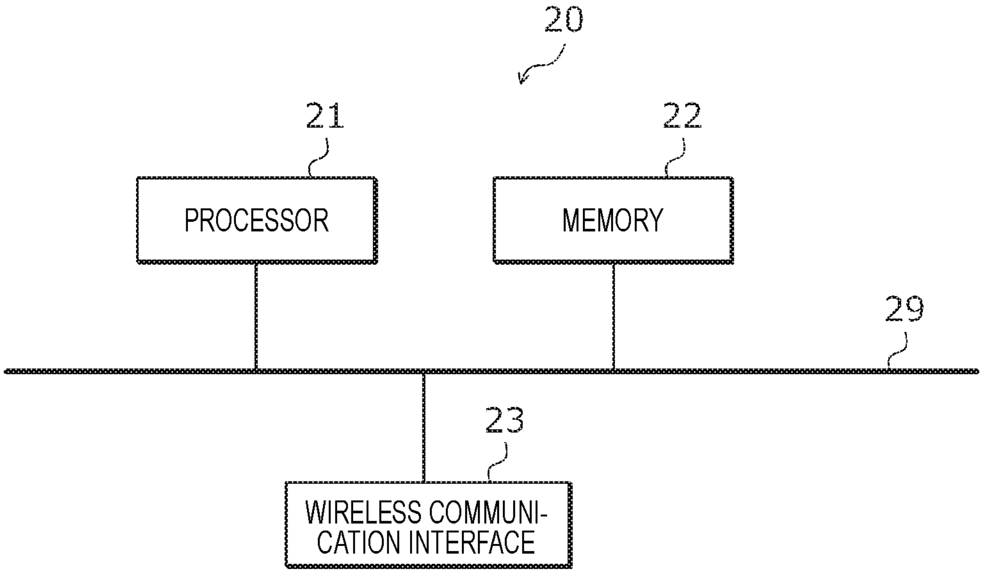
FIG. 3 is a diagram illustrating an example of a hardware configuration of an operation management device 20.

FIG. 3 is a diagram illustrating an example of a hardware configuration of the operation management device 20. The operation management device 20 includes a processor 21, a memory 22, and a wireless communication interface 23. The processor 21, the memory 22, and the wireless communication interface 23 are connected by, for example, the bus 19. A route generation device that executes the route generation method of the present disclosure can be implemented by, for example, the processor 21.

The processor 21, the memory 22, and the wireless communication interface 23 of the operation management device 20 have the same configurations as the processor 11, the memory 12, and the wireless communication interface 13 of the autonomous mobile robot 10 illustrated in FIG. 2, respectively. The wireless communication interface 23 can perform wireless communication with, for example, the autonomous mobile robot 10 and the user terminal 30.

<Hardware Configuration of User Terminal 30>

Figure 4:
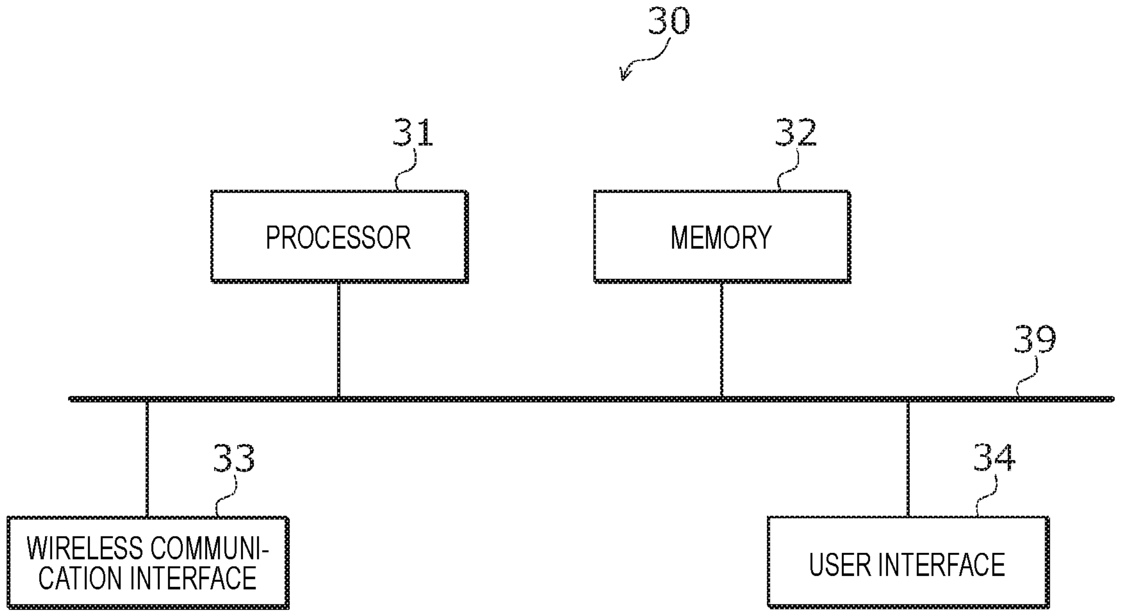
FIG. 4 is a diagram illustrating an example of a hardware configuration of a user terminal 30.

FIG. 4 is a diagram illustrating an example of a hardware configuration of the user terminal 30. The user terminal 30 includes a processor 31, a memory 32, a wireless communication interface 33, and a user interface 34. The processor 31, the memory 32, the wireless communication interface 33, and the user interface 34 are connected by, for example, a bus 39.

The processor 31, the memory 32, and the wireless communication interface 33 of the user terminal 30 have the same configurations as the processor 11, the memory 12, and the wireless communication interface 13 of the autonomous mobile robot 10, respectively. The wireless communication interface 33 performs, for example, wireless communication with the operation management device 20.

The user interface 34 includes, for example, an input device that receives an operation input from a user (for example, the supervisor 1) and an output device that outputs information to the user. The input device can be implemented by, for example, a pointing device (for example, a mouse), a key (for example, a keyboard), a remote control, or the like. The output device can be implemented by, for example, a display or a speaker. The input device and the output device may be implemented by a touch panel or the like. The user interface 34 is controlled by the processor 31.

<Specific Configurations of Processor 11, Memory 12, and Sensor 14 of Autonomous Mobile Robot 10>

Figure 5:
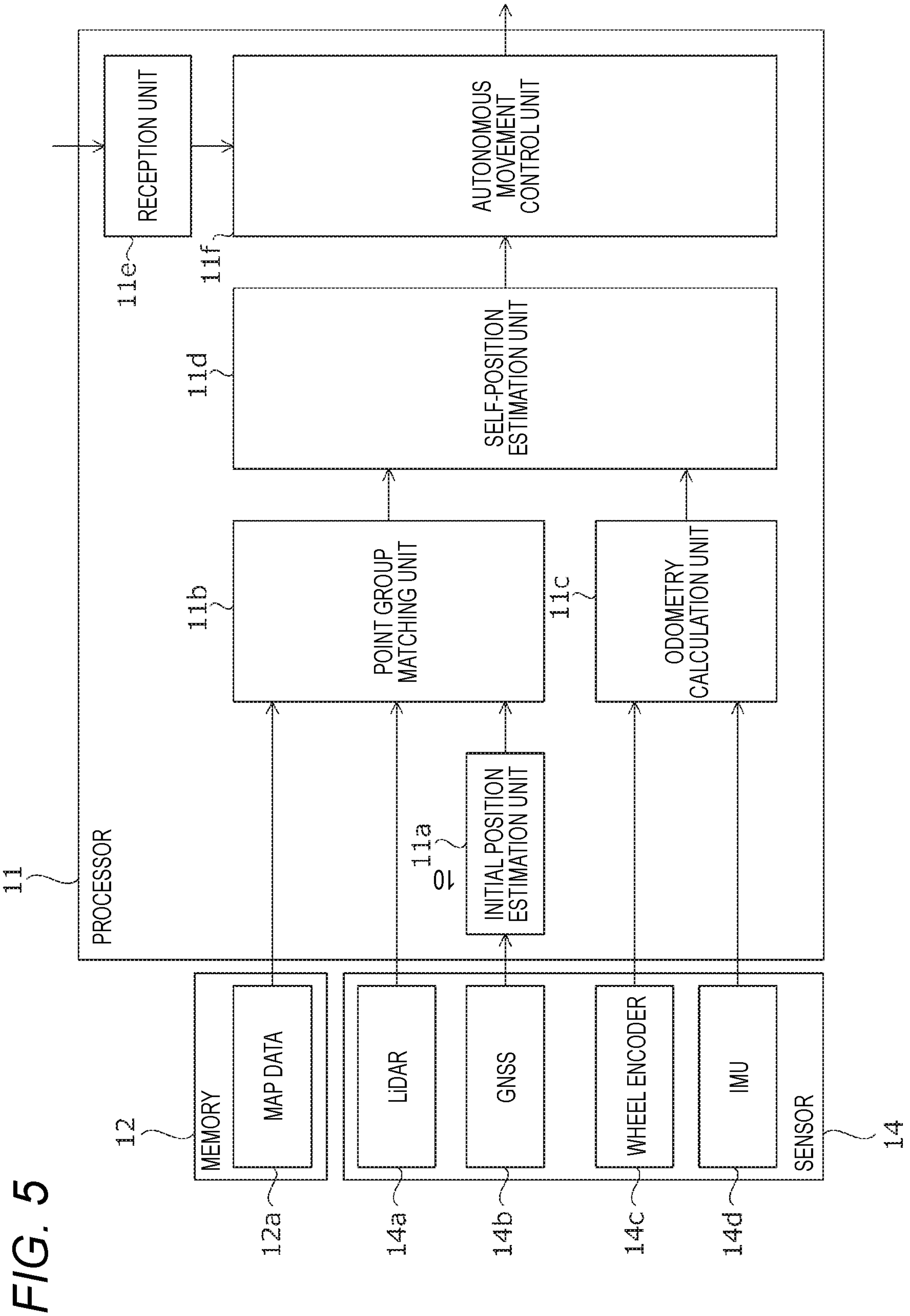
FIG. 5 is a diagram illustrating an example of a specific configuration of a processor 11, a memory 12, and a sensor 14 of the autonomous mobile robot 10.

FIG. 5 is a diagram illustrating an example of specific configurations of the processor 11, the memory 12, and the sensor 14 of the autonomous mobile robot 10.

The memory 12 stores map data 12*a* three-dimensionally indicating an environment in which the autonomous mobile robot 10 autonomously moves. The map data 12*a* is generated by, for example, acquiring sensing data of a LiDAR 14*a* and accumulating the acquired sensing data while the autonomous mobile robot 10 is moved in an environment in which the autonomous mobile robot 10 autonomously moves. The movement of the autonomous mobile robot 10 may be autonomous movement, and may be a movement by a person operating a remote control to operate the autonomous mobile robot 10.

Alternatively, the map data 12*a* may be generated by accumulating sensing data of another device (for example, a sensor of a smartphone or a tablet terminal) instead of accumulating sensing data of the LiDAR 14*a*. Further, the map data 12*a* may be generated not by sensing but by computer-aided design (CAD) or the like.

The sensor 14 includes, for example, the light detection and ranging (LiDAR) 14*a*, a global navigation satellite system profile (GNSS) 14*b*, a wheel encoder 14*c*, and an inertial measurement unit (IMU) 14*d*.

The LiDAR 14*a* is a three-dimensional sensor for three-dimensionally recognizing the external environment of the autonomous mobile robot 10. Specifically, the LiDAR 14*a* measures a distance and a direction to an object by emitting a laser beam and measuring time until the emitted laser beam hits the object and bounces back. The LiDAR 14*a* is provided, for example, so as to be able to sense the front of the autonomous movement of the autonomous mobile robot 10. Further, a plurality of LiDAR 14*a* may be provided so as to be able to sense a plurality of directions. The LiDAR 14*a* may be able to perform swinging (panning and tilting), zooming, or the like.

The GNSS 14*b* is a device that measures the position of the autonomous mobile robot 10 by receiving a signal transmitted from an artificial satellite. The GNSS 14*b* is, for example, a global positioning system (GPS). The wheel encoder 14*c* is a sensor that measures a rotation speed (wheel speed) of the wheel 10*a*. The IMU 14*d* is a sensor that measures an acceleration in each of a front-rear direction, a left-right direction, and an upper-lower direction of the autonomous mobile robot 10, and an angular speed in each of a pitch direction, a roll direction, and a yaw direction The processor 11 includes an initial position estimation unit 11*a*, a point cloud matching unit 11*b*, an odometry calculation unit 11*c*, a self-position estimation unit 11*d*, a reception unit 11*e*, and an autonomous movement control unit 11*f*. These functional units of the processor 11 are achieved, for example, by the processor 11 executing a program stored in the memory 12.

In an initial stage of position estimation of the autonomous mobile robot 10, the initial position estimation unit 11*a* performs position estimation (initial position estimation) of the autonomous mobile robot 10 based on position information of the autonomous mobile robot 10 obtained by the GNSS 14*b*. For example, the initial position estimation unit 11*a* estimates a rough position of the autonomous mobile robot 10 in the environment indicated by the map data 12*a* of the memory 12 as an initial position of the autonomous mobile robot 10 based on the position information of the autonomous mobile robot 10 obtained by the GNSS 14*b*.

The point cloud matching unit 11*b* performs point cloud matching between the map data 12*a* of the memory 12 and the sensing data (scanning point cloud) of the LiDAR 14*a*, and calculates a matching rate (likelihood) with the sensing data of the LiDAR 14*a* for each position of the environment indicated by the map data. At this time, the point cloud matching unit 11*b* can efficiently perform point cloud matching particularly in the initial stage by performing point cloud matching based on the initial position of the autonomous mobile robot 10 estimated by the initial position estimation unit 11*a*.

The odometry calculation unit 11*c* calculates a movement amount and a posture of the autonomous mobile robot 10 based on sensing data (the rotation speed of the wheel 10*a*) of the wheel encoder 14*c* and sensing data (the acceleration and the angular speed of the autonomous mobile robot 10) of the IMU 14*d*.

The self-position estimation unit 11*d* performs position estimation (self-position estimation) of the autonomous mobile robot 10 based on a result of the point group matching by the point group matching unit 11*b*. For example, when there is a position whose matching rate with the sensing data of the LiDAR 14*a* is equal to or higher than a threshold value in the positions of the environment indicated by the map data, the self-position estimation unit 11*d* estimates the position as the position of the autonomous mobile robot 10.

The self-position estimation unit 11*d* may further perform the self-position estimation of the autonomous mobile robot 10 by using the movement amount and the posture of the autonomous mobile robot 10 calculated by the odometry calculation unit 11*c* in an auxiliary manner. As an example, it is assumed that the self-position estimation based on the sensing data of the LiDAR 14*a* is performed at a cycle of 10 [Hz], and the movement amount and the posture of the autonomous mobile robot 10 are calculated by the odometry calculation unit 11*c* at a cycle of 10 [Hz]. In this case, the self-position estimation unit 11*d* interpolates the self-position estimation in a period in which the self-position estimation based on the sensing data of the LiDAR 14*a* is not performed, based on the movement amount and the posture of the autonomous mobile robot 10 calculated by the odometry calculation unit 11*c*.

The self-position estimation by the self-position estimation unit 11*d* may include estimation of the posture of the autonomous mobile robot 10. For example, when the autonomous mobile robot 10 autonomously moves only in a horizontal direction (X direction and Y direction), the initial position estimation unit 11*a* outputs (x, y, θ) indicating a position x in the X direction of the autonomous mobile robot 10, a position y in the Y direction of the autonomous mobile robot 10, and a posture θ (inclination) of the autonomous mobile robot 10 as a result of the self-position estimation.

The reception unit 11*e* uses the wireless communication interface 13 (see FIG. 2) of the autonomous mobile robot 10 to receive, from the operation management device 20, robot route information indicating a robot route along which the autonomous mobile robot 10) autonomously moves, and outputs the received robot route information to the autonomous movement control unit 11*f*.

The autonomous movement control unit 11*f* controls the autonomous movement of the autonomous mobile robot 10 based on the result of the position estimation of the autonomous mobile robot 10 by the self-position estimation unit 11*d* and the robot route information output from the reception unit 11*e*.

For example, the autonomous movement control unit 11*f* calculates drive parameters (for example, a drive direction and a drive amount) of the moving mechanism 15 for the autonomous mobile robot 10 to move from a current location to a next target position based on the result of the position estimation of the autonomous mobile robot 10 and a route of the autonomous mobile robot 10 indicated by the robot route information. Then, the autonomous movement control unit 11*f* performs control to drive the moving mechanism 15 (wheels 10*a*) based on the calculated drive parameters.

<Specific Configurations of Processor 21 and Memory 22 of Operation Management Device 20>

Figure 6:
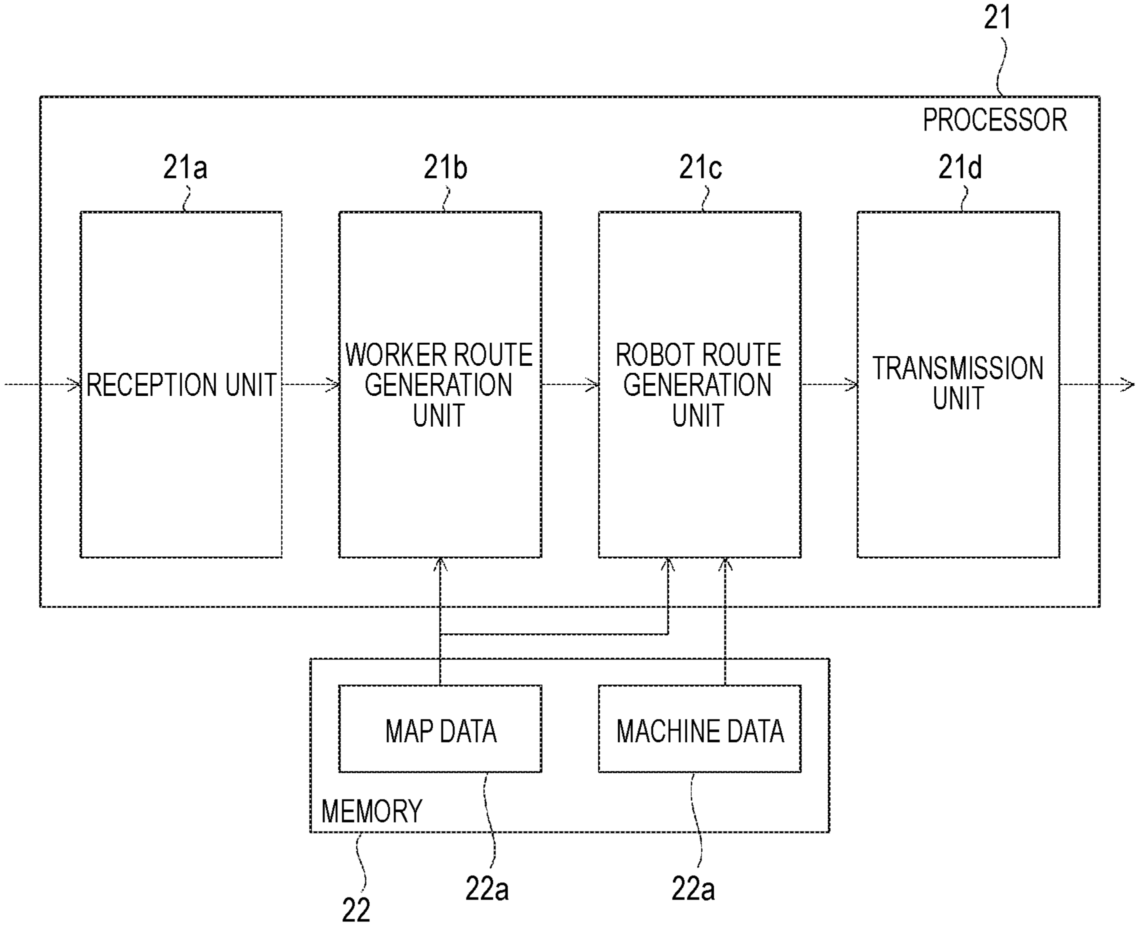
FIG. 6 is a diagram illustrating an example of specific configurations of a processor 21 and a memory 22 of the operation management device 20.

FIG. 6 is a diagram illustrating an example of specific configurations of a processor 21 and a memory 22 of the operation management device 20.

The memory 22 stores map data 22*a* and machine data 22*b*. The map data 22*a* is data three-dimensionally illustrating an environment in which the autonomous mobile robot 10 autonomously moves, and has the same contents as the map data 12*a* of the autonomous mobile robot 10 illustrated in FIG. 5, for example.

The machine data 22*b* is data related to the autonomous mobile robot 10. For example, the machine data 22*b* includes data of a maximum quantity (maximum load quantity) of articles that can be loaded on the autonomous mobile robot 10, and data of a distance (continuous movement distance) by which the autonomous mobile robot 10 can move without being charged halfway after being fully charged.

The processor 21 includes a reception unit 21*a*, a worker route generation unit 21*b*, a robot route generation unit 21*c*, and a transmission unit 21*d*. These functional units of the processor 21 are realized by, for example, the processor 21 executing a program stored in the processor 21.

The reception unit 21*a* receives a delivery request from the user terminal 30 using the wireless communication interface 23 (see FIG. 3) of the operation management device 20.

The worker route generation unit 21*b* generates a worker route based on the delivery request received by the reception unit 21*a* and the map data 22*a*. The worker route is a movement route of a worker who unloads the article conveyed to the delivery destination by the autonomous mobile robot 10 from the autonomous mobile robot 10. The generation of the worker route will be described later.

The robot route generation unit 21*c* generates a robot route based on the delivery request received by the reception unit 21*a*, the map data 22*a*, the machine data 22*b*, and the worker movement generated by the worker route generation unit 21*b*. The robot route is a movement route of the autonomous mobile robot 10 for the autonomous mobile robot 10 to deliver an article to each delivery destination.

Further, the robot route is a route for performing autonomous movement multiple times from a departure point due to restrictions on the quantity of articles that can be loaded on the autonomous mobile robot 10, restrictions on the capacity of the secondary battery used for movement of the autonomous mobile robot 10, and the like. Multiple times of autonomous movement from the departure point are, for example, autonomous movement departing from the departure point and returning to the departure point at least once halfway.

The departure point is a start point of the autonomous movement by the autonomous mobile robot 10. For example, the departure point is a loading point at which an article to be delivered is loaded onto the autonomous mobile robot 10. For example, it is assumed that the autonomous mobile robot 10 cannot deliver articles to all the delivery destinations by one autonomous movement due to the restriction on the quantity of articles that can be loaded on the carrier 10*b*. In this case, the autonomous mobile robot 10 loads an article at a departure point (loading point), departs from the departure point, and returns to the departure point at least once halfway in order to load a new article.

The departure point may be a charging point at which the autonomous mobile robot is charged. For example, it is assumed that the autonomous mobile robot 10 cannot go around all the delivery destinations by one autonomous movement due to the restriction on the capacity of the secondary battery provided in the autonomous mobile robot 10. In this case, the autonomous mobile robot 10 performs charging at the departure point (charging point) and departs from the departure point, and returns to the departure point halfway at least once for charging.

The departure point may be a loading charging point at which an article is loaded onto the autonomous mobile robot 10 and the secondary battery of the autonomous mobile robot 10 is charged.

The transmission unit 21*d* transmits robot route information indicating the robot route generated by the robot route generation unit 21*c* to the autonomous mobile robot 10 using the wireless communication interface 23 (see FIG. 3) of the operation management device 20.

Further, a worker who unloads an article from the autonomous mobile robot 10 is notified of the worker route generated by the worker route generation unit 21*b*. For example, the transmission unit 21*d* transmits worker route information indicating the worker route generated by the worker route generation unit 21*b* to an information terminal (for example, a smartphone) possessed by the worker. The information terminal possessed by the worker notifies the worker of the worker route indicated by the received worker route information by a screen display, voice guidance, or the like.

<Processing of Operation Management Device 20>

Figure 7:
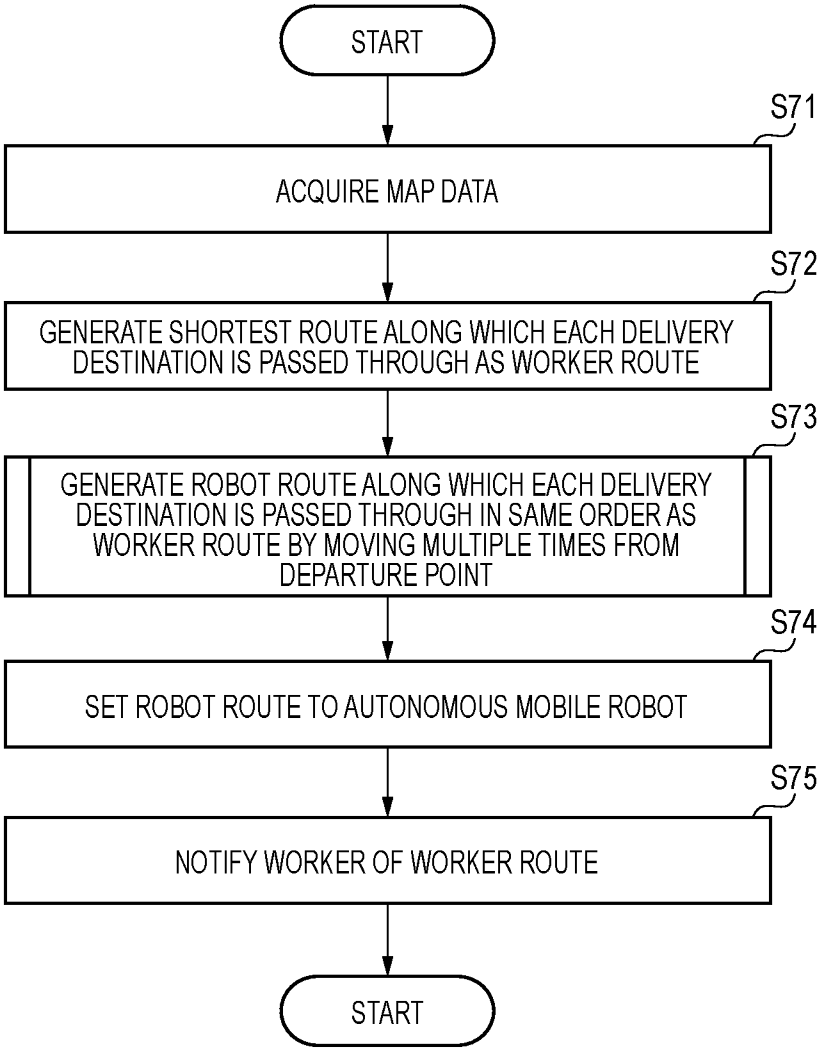
FIG. 7 is a flowchart illustrating an example of processing of the operation management device 20.

FIG. 7 is a flowchart illustrating an example of processing of the operation management device 20. Upon receiving the delivery request from the user terminal 30, the processor 21 of the operation management device 20 executes, for example, the processing illustrated in FIG. 7. First, the processor 21 acquires the map data 22*a* from the memory 22 (step S71).

Next, the processor 21 generates a shortest route of the worker for passing through each delivery destination indicated by the delivery request, as the worker route, based on the map data 22*a* acquired in step S71 (step S72). For example, the processor 21 acquires position information (for example, position coordinates) indicating the position of each delivery destination from the map data 22*a*, and generates a worker route for passing through each delivery destination by a shortest distance based on the acquired position information. The processing of generating the worker route will be described later (for example, see FIG. 10).

Next, the processor 21 generates a robot route for passing through each delivery destination in an order identical to the worker route generated in step S72 by moving multiple times from the departure point (step S73). The processing of generating the robot route will be described later (see, for example, FIGS. 8, 11, and 12).

Next, the processor 21 sets the robot route generated in step S73 to the autonomous mobile robot 10 (step S74). For example, the processor 21 sets the robot route to the autonomous mobile robot 10 by transmitting the robot route information to the autonomous mobile robot 10 through the wireless communication interface 23. Accordingly, the autonomous mobile robot 10 can autonomously move along the robot route generated in step S73 and deliver the article to each delivery destination.

The processor 21 notifies the worker of the worker route generated in step S72 (step S75), and ends the series of processing. For example, the processor 21 notifies the worker of the worker route by transmitting the worker route information to a processing terminal of the worker through the wireless communication interface 23. Accordingly, the worker can move along the worker route generated in step S72 and unload the article from the autonomous mobile robot 10 at each delivery destination. The execution timing of step S75 is not limited to the timing after step S74, and may be any timing after step S72.

<Processing of Generating Robot Route>

Figure 8:
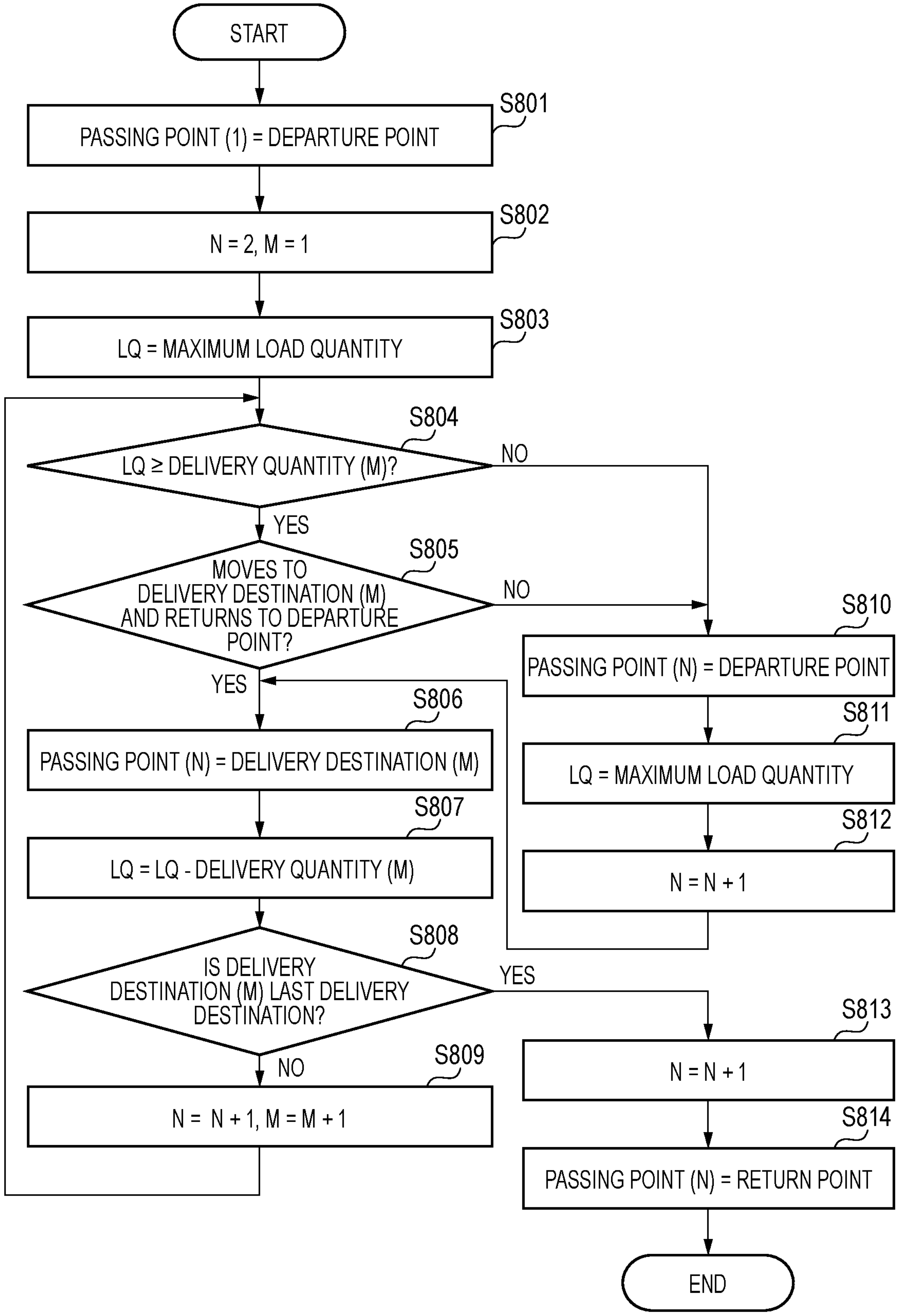
FIG. 8 is a flowchart illustrating an example of processing of generating a robot route.

FIG. 8 is a flowchart illustrating an example of processing of generating a robot route. In step S73 illustrated in FIG. 7, the processor 21 of the operation management device 20 performs, for example, the processing illustrated in FIG. 8. In the example of FIG. 8, the loading charging point where loading of an article to the autonomous mobile robot 10 and charging of the secondary battery of the autonomous mobile robot 10 are performed is set as the departure point of the autonomous mobile robot 10.

A delivery destination (M) in FIG. 8 is the M-th delivery destination in the worker route generated in step S72 in FIG. 7. That is, it is determined in step S72 that the worker goes around each delivery destination in the order of a delivery destination (1), a delivery destination (2), a delivery destination (3) . . . .

In step S73 of FIG. 7, the robot route is generated such that the autonomous mobile robot 10 returns to the departure point halfway for loading an article or charging and goes around the delivery destinations in the same order as the worker. A passing point (X) in FIG. 8 indicates a point through which the autonomous mobile robot 10 passes for the X-th time in the robot route. That is, a route for passing through a passing point (1), a passing point (2), a passing point (3) . . . in this order is the robot route.

A delivery quantity (M) in FIG. 8 is the quantity of articles to be delivered to the delivery destination (M) by the autonomous mobile robot 10. The quantity of articles to be delivered to each delivery destination by the autonomous mobile robot 10 is included in, for example, the delivery request transmitted from the user terminal 30 to the operation management device 20.

First, the processor 21 sets the passing point (1) as the departure point (for example, a loading charging point) (step S801). The processor 21 sets N to “2” and M to “1” (step S802). N is an index of the passing point. M is an index of a delivery destination.

The processor 21 sets LQ to the maximum load quantity (step S803). LQ is a calculated quantity of articles loaded by the autonomous mobile robot 10. The maximum load quantity is the maximum quantity of articles that can be loaded on the carrier 10*b* based on the specification of the autonomous mobile robot 10. When the autonomous mobile robot 10 moves to the loading charging point (departure point), the articles are loaded to the autonomous mobile robot 10 up to the maximum load quantity.

Next, the processor 21 determines whether the current LQ is greater than or equal to the delivery quantity (M) (step S804). Accordingly, when a next passing point (N) is set as the delivery destination (M), it is possible to determine whether the quantity of articles remaining in the autonomous mobile robot 10 at a passing point (N−1) is sufficient for the quantity of articles to be delivered to the delivery destination (M).

At step S804, when LQ is equal to or greater than the delivery quantity (M) (step S804: Yes), the processor 21 determines whether the autonomous mobile robot 10 can move to the delivery destination (M) and return to the departure point when the next passing point (N) is set as the delivery destination (M), that is, when the autonomous mobile robot 10 moves from the passing point (N−1) to the delivery destination (M) (step S805).

For example, the processor 21 calculates a movement distance of the route from the departure point to the departure point based on the map data 22*a* when the next passing point (N) is set as the delivery destination (M) and a next passing point (N+1) is further set as the departure point. Then, the processor 21 performs determination of step S805 by comparing the calculated movement distance with the continuous movement distance of the autonomous mobile robot 10 indicated by the machine data 22*b*.

In step S805, when the autonomous mobile robot 10 moves to the delivery destination (M) and returns to the departure point (step S805: Yes), the processor 21 sets the next passing point (N) as the delivery destination (M) (step S806). The processor 21 subtracts the delivery quantity (M) from the current LQ (step S807). Accordingly, it is possible to calculate the number of articles to be loaded on the autonomous mobile robot 10 after unloading from the autonomous mobile robot 10 at the delivery destination (M).

Next, the processor 21 determines whether the delivery destination (M) is the last delivery destination of the autonomous mobile robot 10 (step S808). When the delivery destination (M) is not the last delivery destination of the autonomous mobile robot 10 (step S808: No), the processor 21 increments N and M (step S809), and returns to step S804.

In step S804, when LQ is not equal to or greater than the delivery quantity (M) (step S804: No), the processor 21 sets the passing point (N) as the departure point (step S810). The processor 21 sets LQ to the maximum load quantity (step S811). The processor 21 increments N (step S812) and proceeds to step S806.

In step S805, when the autonomous mobile robot 10 cannot move to the delivery destination (M) and return to the departure point (step S805: No), the processor 21 proceeds to step S810.

In step S808, when the delivery destination (M) is the last delivery destination of the autonomous mobile robot 10 (step S808: Yes), the processor 21 increments N (step S813) and sets the passing point (N) as the return point (step S814). The return point may be designated by a delivery request from the user terminal 30 or may be predetermined. The return point is, for example, the same point as the departure point, and may be a point different from the departure point.

As illustrated in FIG. 8, the processor 21 (the robot route generation unit 21*c*) generates a robot route based on the quantity of articles that the autonomous mobile robot 10 can load (the maximum load quantity) and the quantity of articles to be delivered to each of the plurality of delivery destinations. That is, the processor 21 generates the robot route based on the information under a constraint condition that the autonomous mobile robot 10 returns to the loading point (departure point) when no article is to be loaded.

Further, the processor 21 generates a robot route based on the continuous movement distance that the autonomous mobile robot 10 can continuously move from the charging point at which the autonomous mobile robot 10 is charged, and position information indicating positions of the departure point, the plurality of delivery destinations, and the charging point (departure point). That is, the processor 21 generates the robot route based on this information under a constraint condition that the autonomous mobile robot 10 is not allowed to move due to running out of a battery remaining amount during autonomous movement.

Accordingly, the autonomous mobile robot 10 can generate a robot route that allows the autonomous mobile robot 10 to pass through each delivery destination in the same order as the worker route and to deliver a necessary number of articles to each delivery destination without causing shortage of a battery remaining amount.

In the example of FIG. 8, a case where the loading point and the charging point are the same is described, but the loading point and the charging point may be different points. For example, it is assumed that the loading point and the charging point are different and the autonomous mobile robot 10 is fully charged in an initial state. In this case, in step S801 of FIG. 8, the processor 21 sets the passing point (1) as the loading point. When the processor 21 proceeds from step S804 to step S810, the processor 21 sets the passing point (N) in step S810 as the loading point. When the process proceeds from step S805 to step S810, the processor 21 sets the passing point (N) as the loading point in step S810, and skips step S811.

<Environment Where Delivery is Performed by Autonomous Mobile Robot 10>

Figure 9:
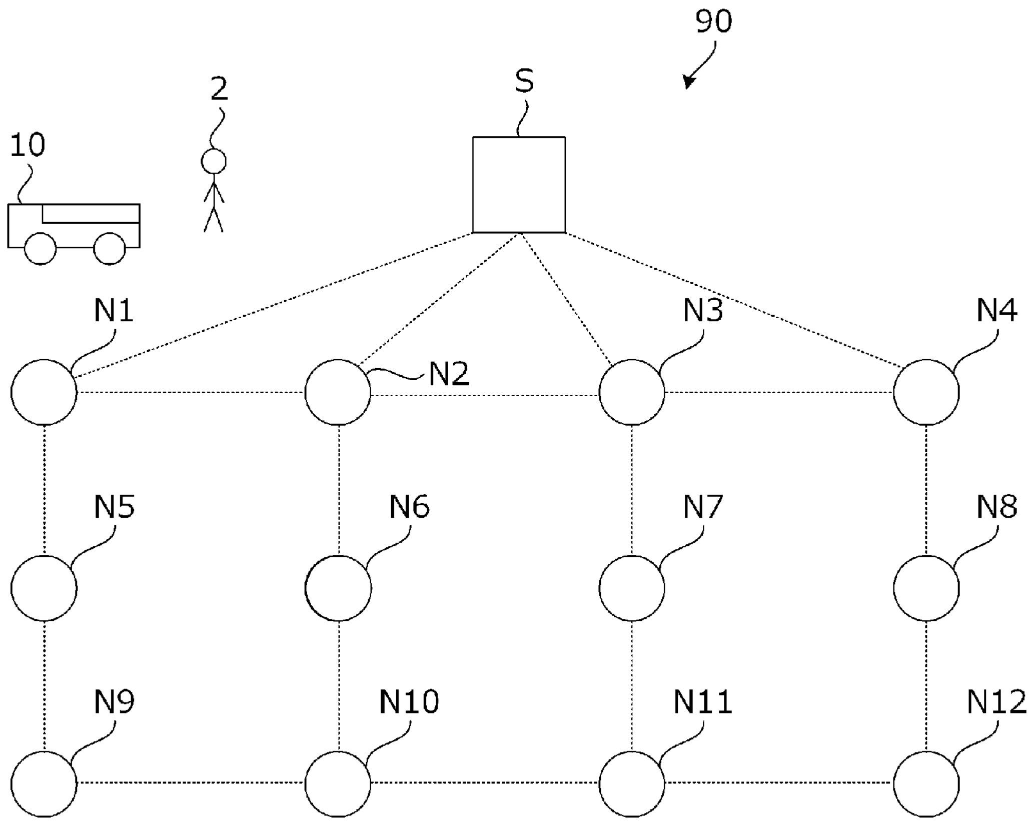
FIG. 9 is a diagram illustrating an example of an environment in which the autonomous mobile robot 10 performs delivery.

FIG. 9 is a diagram illustrating an example of an environment in which the autonomous mobile robot 10 performs delivery. The environment 90 illustrated in FIG. 9 includes a departure point S and delivery destinations N1 to N12. The departure point S is a loading charging point at which articles to be delivered to the delivery destinations N1 to N12 are loaded onto the autonomous mobile robot 10 and the autonomous mobile robot 10 is charged.

A worker 2 is a worker who unloads an article from the autonomous mobile robot 10 at the delivery destinations N1 to N12. The worker 2 is, for example, a person, but may be an unloading robot or the like that is autonomously movable. The worker 2 moves along a worker route generated by the operation management device 20 by walking, for example. The worker 2 may be the same person as the supervisor 1 who operates the user terminal 30 or may be a different person.

The article at the departure point S is loaded onto the autonomous mobile robot 10 by a person or a loading robot (different from the worker 2) located at the departure point S. That is, the worker 2 does not need to move to the departure point S for loading.

Broken lines between the departure point S and the delivery destinations N1 to N12 indicate inter-point routes along which the autonomous mobile robot 10 can move. The position information of the departure point S and the delivery destinations N1 to N12 and information of the inter-point routes therebetween are included in, for example, the map data 22*a*. A movement cost when the worker 2 or the autonomous mobile robot 10 moves along the inter-point route is set for each inter-point route.

The movement cost is set based on a distance between points, time required for the movement, or the like. The movement cost may be set in advance or may be calculated and set by the operation management device 20 based on the map data 22*a*.

The movement cost of the worker 2 and the movement cost of the autonomous mobile robot 10 in the same inter-point route may be different. For example, in a case where a time required for the movement is set as the movement cost, in order to move from a certain point to another point, a route of a shortest distance for the worker 2 is a route of a shortest time (low cost), but for the autonomous mobile robot 10, a detour route that is leveled and allows high-speed movement may be the route of the shortest time (lowest cost).

In step S72 illustrated in FIG. 7, the operation management device 20 calculates the shortest route for passing through all of the delivery destinations N1 to N12 and having the minimum sum of the movement costs by a route search, and sets the calculated shortest route as the worker route.

Further, the processor 21 may generate a shortest worker route from a departure point of the worker 2 to a return point of the worker 2 through the delivery destinations N1 to N12 by further using the position information indicating the position of the departure point of the worker 2 and the position information indicating the position of the return point (not illustrated) of the worker 2. The departure point of the worker 2 may be the same as or different from the departure point S of the autonomous mobile robot 10. The return point of the worker 2 may be the same as or different from the return point (for example, the departure point S) of the autonomous mobile robot 10. The departure point and the return point of the worker 2 are designated, for example, by the delivery request from the user terminal 30 together with the delivery destinations N1 to N12.

In step S72 illustrated in FIG. 7, the operation management device 20 may generate the robot route based on information indicating the distance between points including the departure point S and the delivery destinations N1 to N12 and information indicating a speed of the autonomous mobile robot 10 between the points. The information is acquired from, for example, the map data 22*a*. For example, the operation management device 20 may calculate the time required for the movement between the points as the movement cost based on the information, calculate the shortest route having the minimum sum of the movement costs by the route search, and set the calculated shortest route as the worker route.

<Worker Route in Environment 90 Illustrated in FIG. 9>

Figure 10:
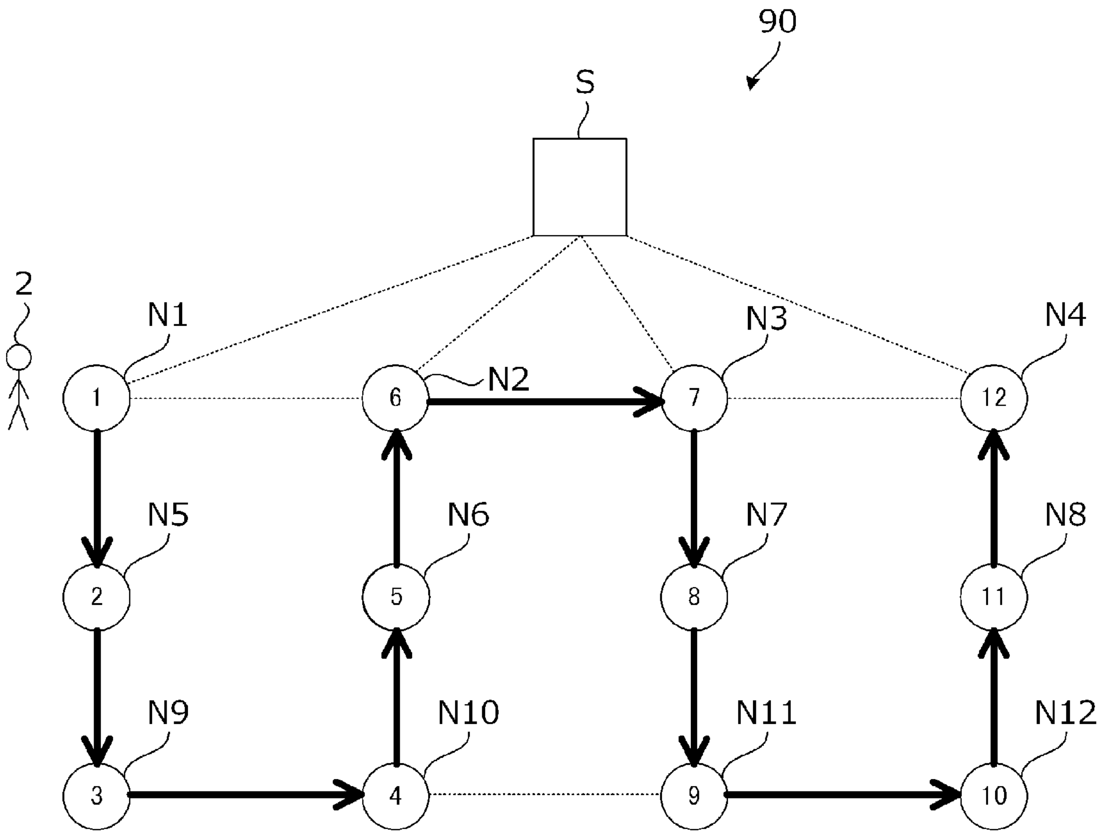
FIG. 10 is a diagram illustrating an example of a worker route in an environment 90 illustrated in FIG. 9.

FIG. 10 is a diagram illustrating an example of a worker route in the environment 90 illustrated in FIG. 9. Thick arrows illustrated in FIG. 10 are the worker route generated by the operation management device 20 in step S72 illustrated in FIG. 7. Numbers illustrated in the delivery destinations N1 to N12 indicate the order of passing through the delivery destinations in the worker route.

In the example of FIG. 10, the worker route is a route along which the worker 2 passes through the delivery destination N1, the delivery destination N5, the delivery destination N9, the delivery destination N10, the delivery destination N6, the delivery destination N2, the delivery destination N3, the delivery destination N7, the delivery destination N11, the delivery destination N12, the delivery destination N8, and the delivery destination N4 in this order. The worker route may include a departure point and a return point of the worker 2 in addition to the delivery destinations N1 to N12.

<Robot Route in Environment 90 Illustrated in FIG. 9>

Figure 11:
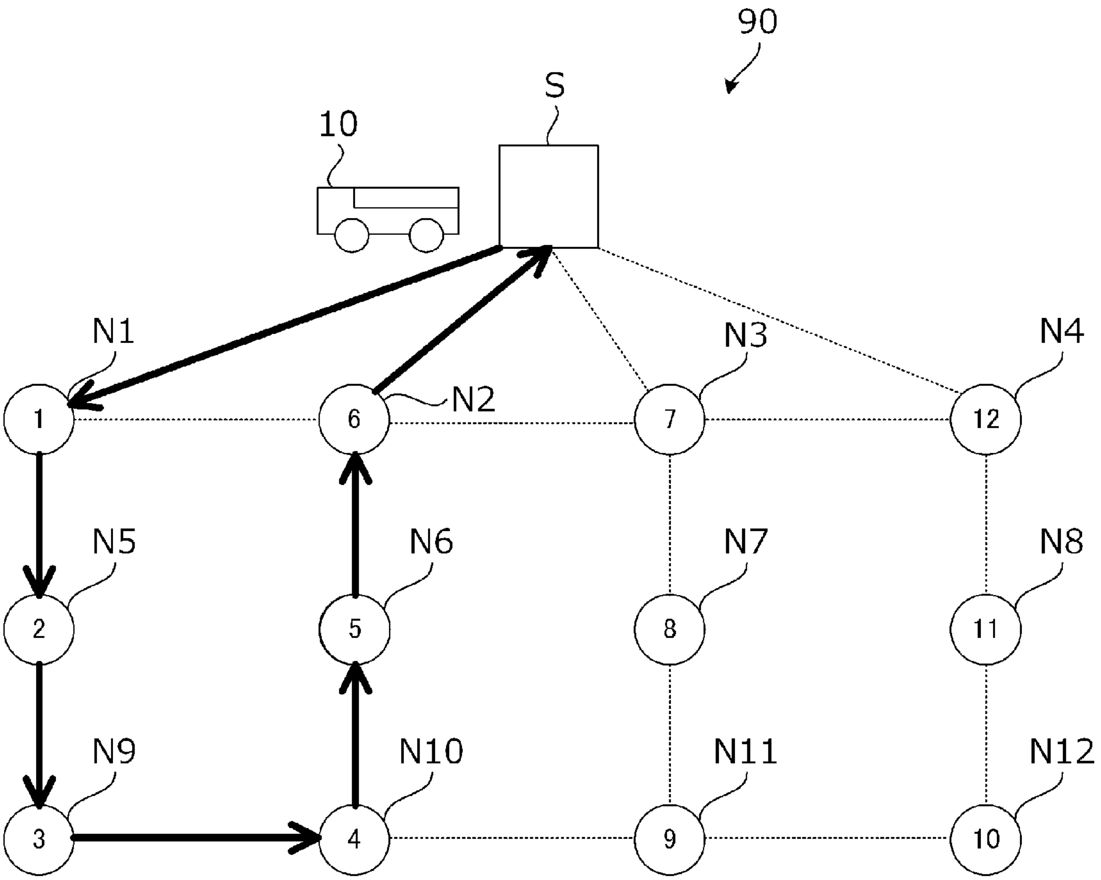
FIG. 11 is a first diagram illustrating an example of a robot route in the environment 90 illustrated in FIG. 9.
Figure 12:
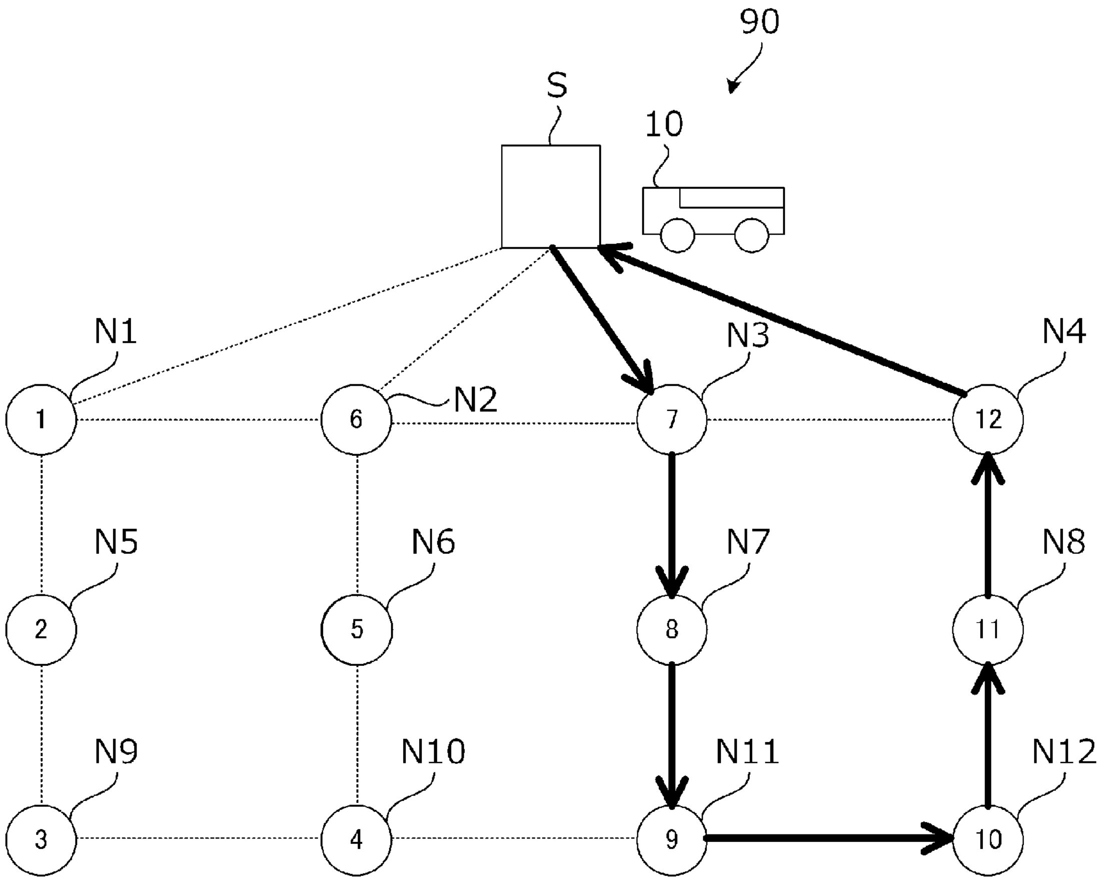
FIG. 12 is a second diagram illustrating an example of the robot route in the environment 90 illustrated in FIG. 9.

FIGS. 11 and 12 are diagrams illustrating examples of a robot route in the environment 90 illustrated in FIG. 9. Thick arrows illustrated in FIGS. 11 and 12 are the robot route generated by the operation management device 20 in step S73 illustrated in FIG. 7. Specifically, the robot route generated by the operation management device 20 in step S73 is a route including the route indicated by the thick arrow in FIG. 11 and the route indicated by the thick arrow in FIG. 12 in this order.

In the examples of FIGS. 11 and 12, the robot route is a route along which the autonomous mobile robot 10 passes through the departure point S, the delivery destination N1, the delivery destination N5, the delivery destination N9, the delivery destination N10, the delivery destination N6, the delivery destination N2, the departure point S, the delivery destination N3, the delivery destination N7, the delivery destination N11, the delivery destination N12, the delivery destination N8, the delivery destination N4, and the departure point S in this order. The robot route is a route for performing autonomous movement a plurality of times (twice) from the departure point S (departure point).

As described above, the operation management device 20 generates the robot route for passing through the delivery destinations N1 to N12 by moving multiple times from the departure point S, based on the order in which the worker 2 passes through the delivery destinations N1 to N12 (the plurality of destination points) by the shortest route. Accordingly, the worker 2 can go around the delivery destinations N1 to N12 by the shortest route, and the autonomous mobile robot 10 can go around the delivery destinations N1 to N12 in the same order as the worker 2 while returning to the departure point S halfway. Therefore, movement time of the worker 2 can be shortened, and the autonomous mobile robot 10 can deliver the required number of articles to the delivery destinations N1 to N12 without causing the shortage of the battery remaining amount.

By shortening the movement time of the worker 2, for example, the period of time from when the autonomous mobile robot arrives at the delivery destination to when the worker 2 arrives at the delivery destination and starts work is shortened, and time required for the entire delivery work can be shortened. Further, when the worker 2 is a person, fatigue of the worker 2 can be reduced by shortening the movement time of the worker 2. In this way, it is possible to improve the efficiency of the work in which the autonomous mobile robot 10 and the worker 2 cooperate with each other.

<Processing of Operation Management Device 20 When Delivery is Performed by Plurality of Autonomous Mobile Robots>

Figure 13:
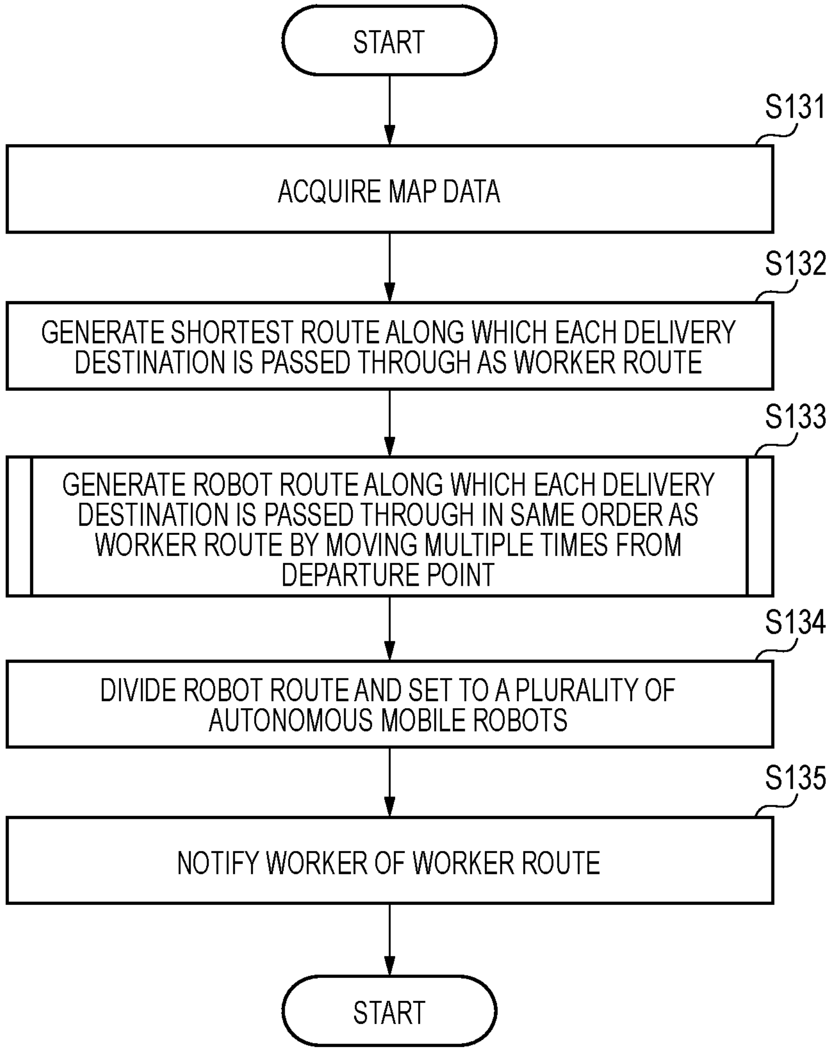
FIG. 13 is a flowchart illustrating an example of processing of the operation management device 20 when delivery is performed by a plurality of autonomous mobile robots.

FIG. 13 is a flowchart illustrating an example of processing of the operation management device 20 when delivery is performed by a plurality of autonomous mobile robots. Although the case where the delivery is performed by one autonomous mobile robot 10 has been described, the delivery may be performed by the plurality of autonomous mobile robots. In this case, upon receiving the delivery request from the user terminal 30, the processor 21 of the operation management device 20 executes, for example, the processing illustrated in FIG. 13.

Steps S131 to S135 illustrated in FIG. 13 are the similar to steps S71 to S75 illustrated in FIG. 7. However, in step S134, the processor 21 divides the robot route generated in step S133, and sets each of the divided robot routes to the plurality of autonomous mobile robots (step S134).

<Environment Where Delivery is performed by Plurality of Autonomous Mobile Robots>

Figure 14:
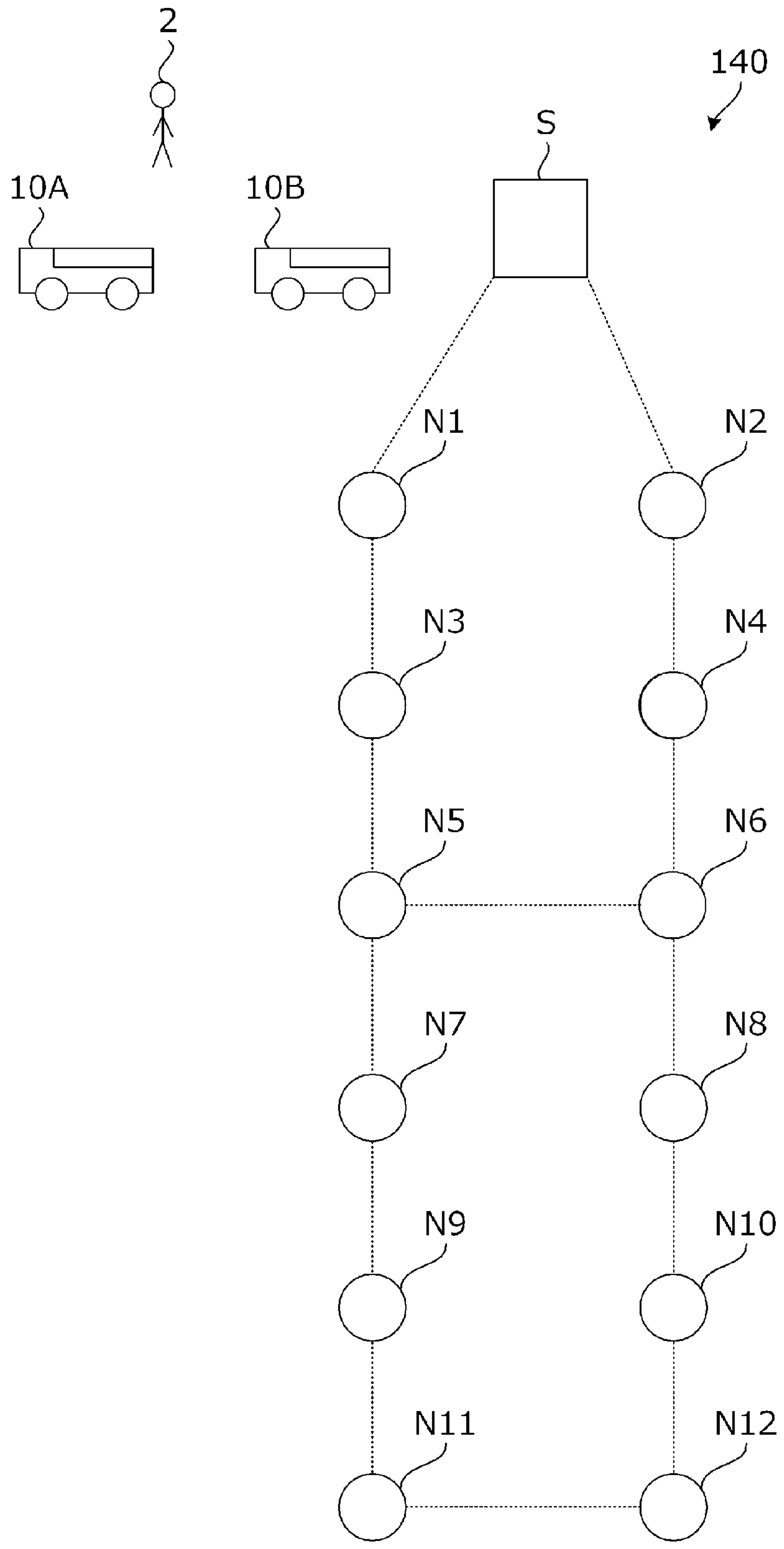
FIG. 14 is a diagram illustrating an example of an environment in which delivery is performed by the plurality of autonomous mobile robots.

FIG. 14 is a diagram illustrating an example of an environment in which delivery is performed by the plurality of autonomous mobile robots. An environment 140 illustrated in FIG. 14 is similar to the environment 90 illustrated in FIG. 9, but the arrangement of the delivery destinations N1 to N12 and the inter-point routes (broken lines) between points including the departure point S and the delivery destinations N1 to N12 are different. Further, in the example of FIG. 14, delivery to the delivery destinations N1 to N12 is performed by autonomous mobile robots 10A, 10B in a shared manner. Each of the autonomous mobile robots 10A, 10B has a configuration similar to that of the above-described autonomous mobile robot 10.

<Worker Route in Environment 140 Illustrated in FIG. 14>

Figure 15:
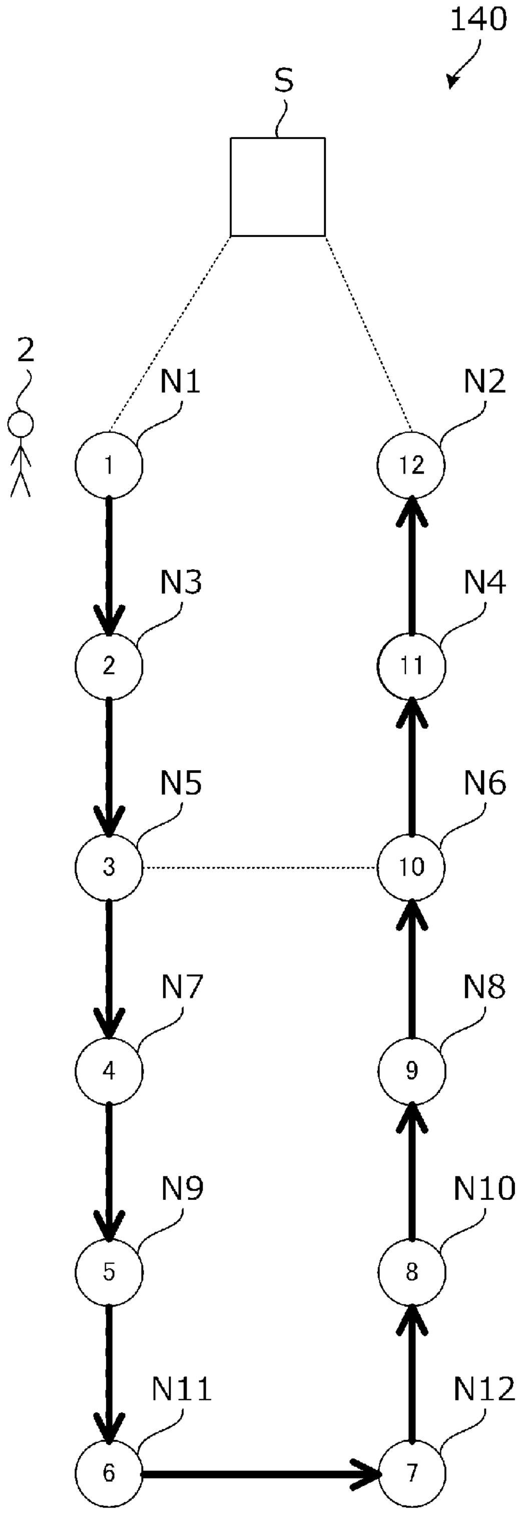
FIG. 15 is a diagram illustrating an example of a worker route in an environment 140 illustrated in FIG. 14.

FIG. 15 is a diagram illustrating an example of a worker route in the environment 140 illustrated in FIG. 14. Thick arrows illustrated in FIG. 15 is the worker route generated by the operation management device 20 in step S132 illustrated in FIG. 13.

In the example of FIG. 15, the worker route is a route along which the worker 2 passes through the delivery destination N1, the delivery destination N3, the delivery destination N5, the delivery destination N7, the delivery destination 9, the delivery destination 11, the delivery destination N12, the delivery destination N10, the delivery destination N8, the delivery destination N6, the delivery destination N4, and the delivery destination N2 in this order.

<Robot Route in Environment 140 Illustrated in FIG. 14>

FIGS. 16 to 19 are diagrams illustrating examples of a robot route in the environment 140 illustrated in FIG. 14. Thick arrows illustrated in FIGS. 16 to 19 are robot routes generated by the operation management device 20 in step S133 illustrated in FIG. 13 and divided by the operation management device 20 in step S134 illustrated in FIG. 13.

Figure 16:
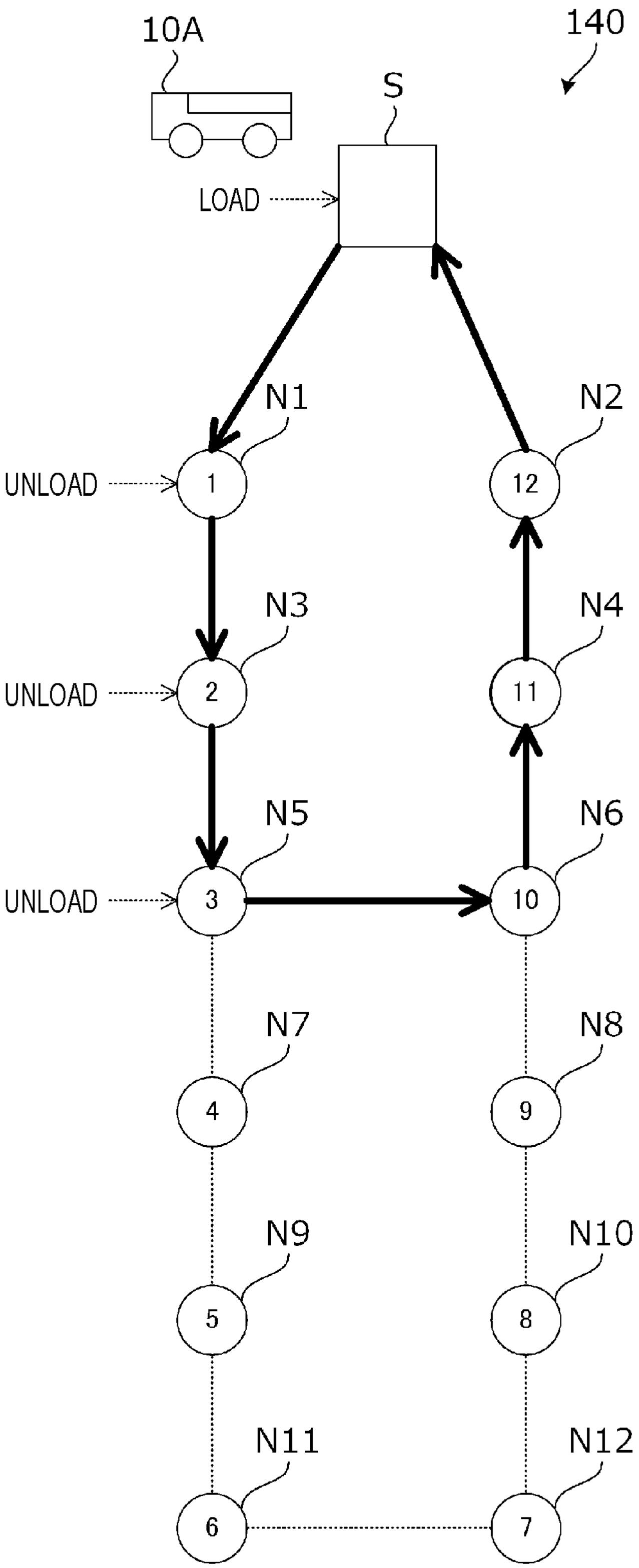
FIG. 16 is a first diagram illustrating an example of a robot route in the environment 140 illustrated in FIG. 14.
Figure 17:
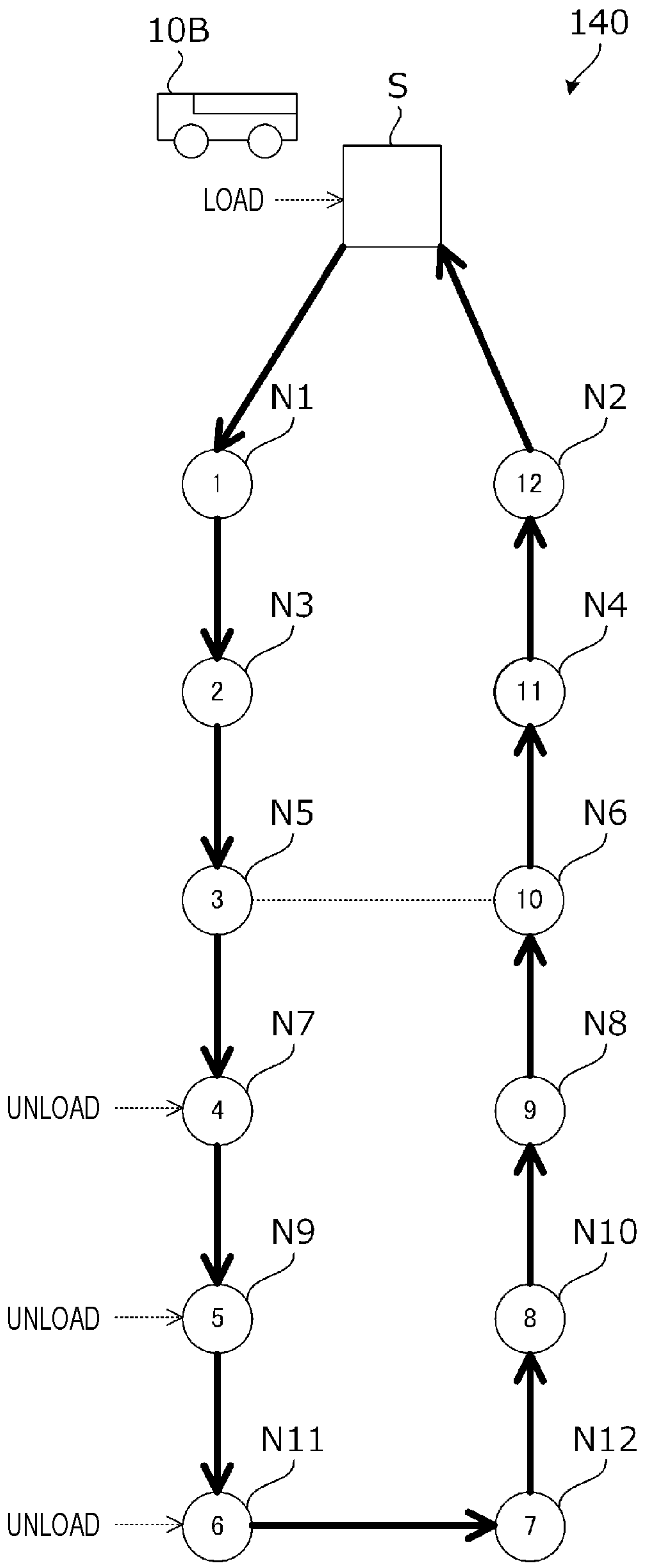
FIG. 17 is a second diagram illustrating an example of the robot route in the environment 140 illustrated in FIG. 14.
Figure 18:
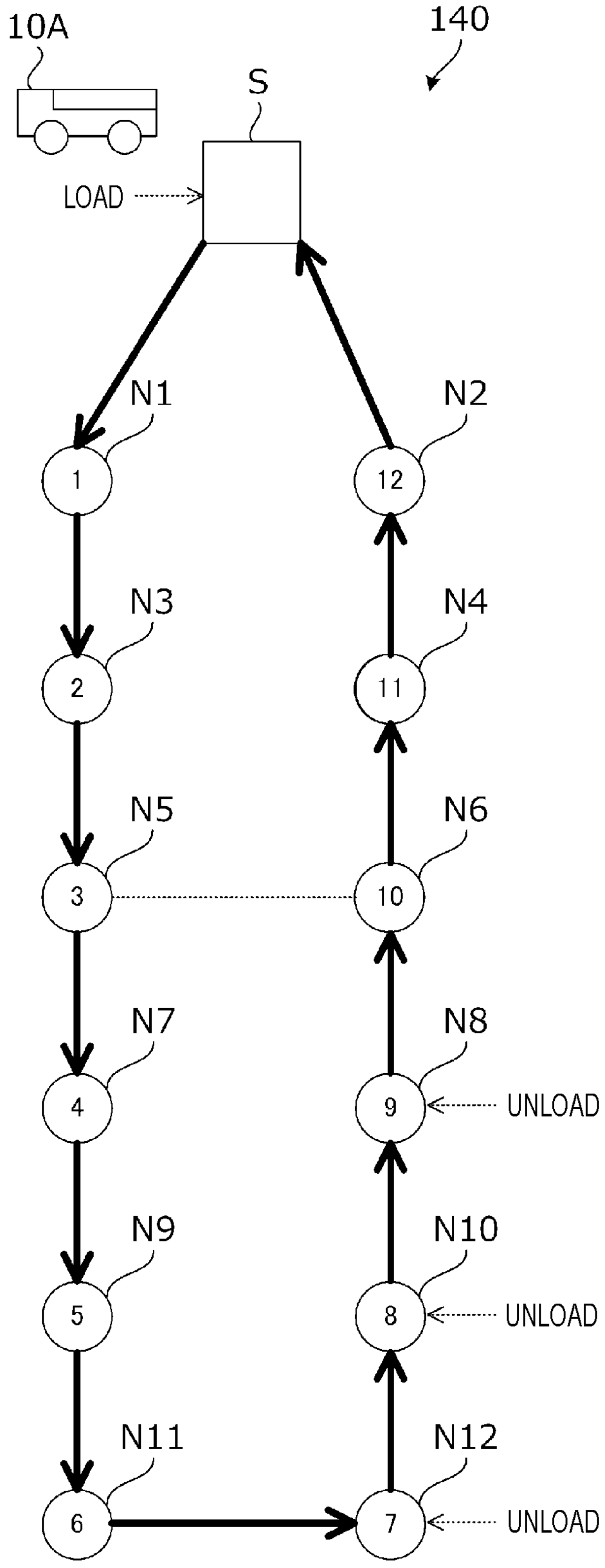
FIG. 18 is a third diagram illustrating an example of the robot route in the environment 140 illustrated in FIG. 14.
Figure 19:
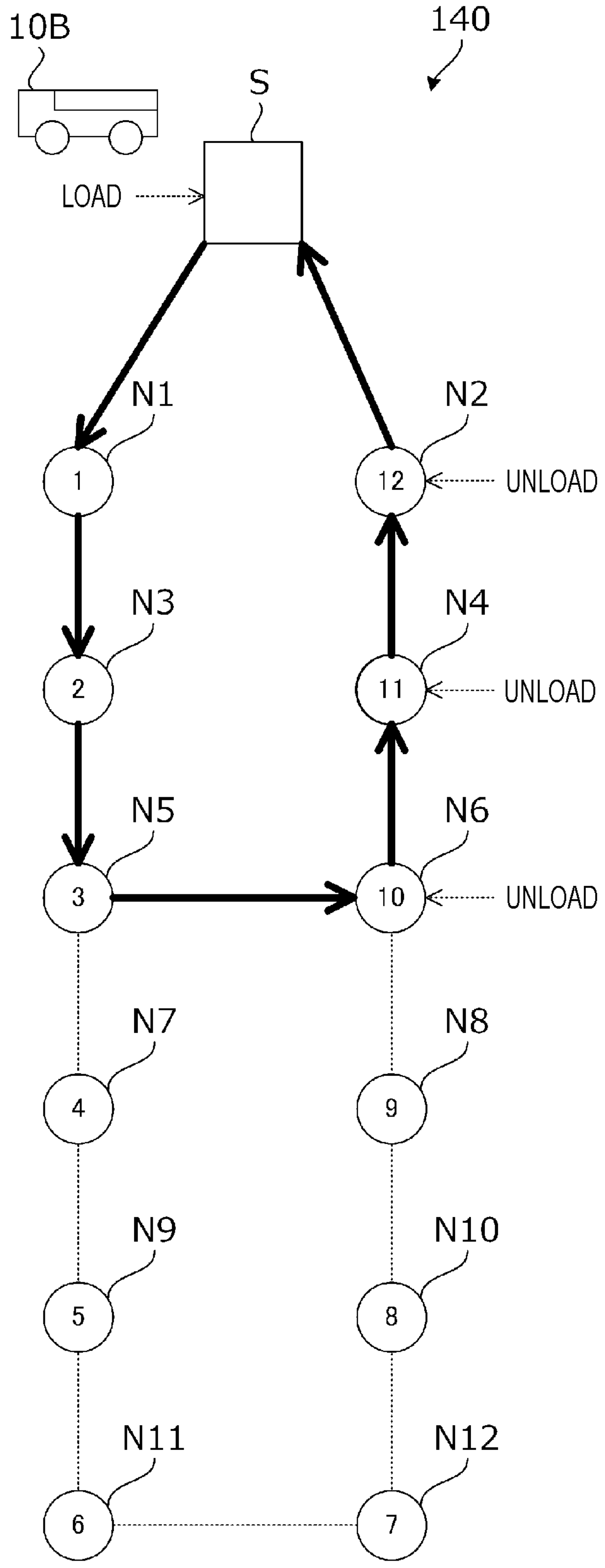
FIG. 19 is a fourth diagram illustrating an example of the robot route in the environment 140 illustrated in FIG. 14.

In the example of FIGS. 16 to 19, the robot route generated in step S133 illustrated in FIG. 13 is a route in which the robot firstly moves along a route indicated by the thick arrow in FIG. 16 to perform unloading at the delivery destinations N1, N3, and N5, then moves along the route indicated by the thick arrow in FIG. 17 to perform unloading at the delivery destinations N7, N9, and N11, next moves along the route indicated by the thick arrow in FIG. 18 to perform unloading at the delivery destinations N12, N10, and N8, and then moves along the route indicated by the thick arrow in FIG. 19 to perform unloading at the delivery destinations N6, N4, and N2.

In step S134 illustrated in FIG. 13, the operation management device 20 divides the robot route at the departure point S. In this example, the robot route is divided into four robot routes: the robot route indicated by the thick arrow in FIG. 16, the robot route indicated by the thick arrow in FIG. 17, the robot route indicated by the thick arrow in FIG. 18, and the robot route indicated by the thick arrow in FIG. 19.

In step S134 illustrated in FIG. 13, the operation management device 20 distributes and sets the divided robot routes to the autonomous mobile robots 10A, 10B. For example, the operation management device 20 sets odd-numbered robot routes (robot routes in FIGS. 16 and 18) among the four divided robot routes to the autonomous mobile robot 10A, and sets even-numbered robot routes (robot routes in FIGS. 17 and 19) to the autonomous mobile robot 10B.

Accordingly, it becomes possible to perform the autonomous movement of the autonomous mobile robots 10A. 10B in a temporally overlapping manner, such as the autonomous mobile robot 10A first performs delivery along the robot route of FIG. 16, the autonomous mobile robot 10B loads an article and is charged at the departure point S during the delivery, the autonomous mobile robot 10B next performs delivery along the robot route of FIG. 17, the autonomous mobile robot 10A loads an article and is charged at the departure point S during the delivery, the autonomous mobile robot 10A next performs delivery along the robot route of FIG. 18, the autonomous mobile robot 10B loads an article and is charged at the departure point S during the delivery, and the autonomous mobile robot 10B next performs delivery along the robot route of FIG. 19, and it is possible to improve the efficiency of the operation.

The operation management device 20 may generate the robot routes of the autonomous mobile robots 10A, 10B such that the autonomous mobile robots 10A, 10B do not pass through the same point from different directions. For example, in the examples of FIGS. 16 to 19, with respect to each of the inter-point routes indicated by the broken lines, the direction of passing through the inter-point route is constant.

Accordingly, even when the autonomous movement of the autonomous mobile robots 10A, 10B is performed in a temporally overlapping manner, it is possible to avoid passing of the autonomous mobile robots 10A, 10B. Therefore, it is possible to suppress a collision accident due to a delay caused by a passing operation of the autonomous mobile robots 10A, 10B or an error in the passing operation of the autonomous mobile robots 10A. 10B.

<Modification 1>

Communication between the operation management device 20 and the user terminal 30 may be wired communication instead of wireless communication. The communication between the operation management device 20 and the user terminal 30 may be communication via a network instead of direct communication.

<Modification 2>

The operation management device 20 and the user terminal 30 may be configured as one device. For example, the user interface 34 may be provided in the operation management device 20, and the user terminal 30 may be omitted from the operation system 100.

<Modification 3>

The route generation device that executes the route generation method of the present disclosure may be implemented by, for example, the processor 11 of the autonomous mobile robot 10. In this case, for example, the processor 11 of the autonomous mobile robot 10 executes the processing illustrated in FIGS. 7 and 13. When the processor 11 of the autonomous mobile robot 10A executes the processing of FIG. 13 in the examples of FIGS. 13 to 19, in step S134 of FIG. 13, the processor 11 sets the divided robot routes to the autonomous mobile robot 10A (self device) and the autonomous mobile robot 10B, respectively.

<Modification 4>

Although the case where the autonomous mobile robot 10 delivers an article at the departure point to the plurality of destination points has been described, the use of the autonomous mobile robot 10 is not limited to delivery. For example, the autonomous mobile robot 10 may be a robot that collects articles. In this case, the plurality of destination points are points where articles (for example, waste) to be collected by the autonomous mobile robot 10 are placed, and the worker performs work of loading the articles onto the autonomous mobile robot 10 at the plurality of destination points.

Alternatively, the autonomous mobile robot 10 may be a robot that measures a physical quantity (for example, air cleanliness) at the destination point. In this case, the plurality of destination points are points to be measured by the autonomous mobile robot 10, and the worker performs work such as an operation of performing measurement by the autonomous mobile robot 10 and monitoring a measurement situation at the plurality of destination points.

<Modification 5>

Although the configuration in which the worker route and the robot route are generated by the route generation device implemented by the processor 11 and the processor 21 has been described, a device other than the route generation device may generate the worker route. For example, the route generation device may receive a worker route generated by another device, or information indicating an order of passing through a plurality of destination points on the worker route from the other device, and may generate a robot route based on the received information.

<Modification 6>

As an example of the moving body, the moving body that is autonomously movable (for example, the autonomous mobile robot 10) has been described, but the moving body may move not by the autonomous movement but by operation of a person (for example, a machine that assists transportation). The movement by the operation of a person may be performed by using human power as the driving force or may be performed by using electric power or heat as the driving force.

In the present specification, at least the following matters are described. Corresponding constituent elements and the like in the embodiments described above are shown in parentheses, but the present invention is not limited thereto.

(1) A route generation method for generating a route along which a moving body (autonomous mobile robots 10, 10A, and 10B) travels from a departure point (a departure point S) and passes through a plurality of destination points (delivery destinations N1 to N12), the route generation method causing a computer (processors 11, 21) to execute:

- a first step (steps S72, S132) of acquiring an order for passing through the plurality of destination points by a shortest route: and
- a second step (steps S73, S133) of generating a route of the moving body for passing through the plurality of destination points by moving multiple times from the departure point, based on the order acquired in the first step.

According to (1), it is possible to generate the route of the moving body for passing through the plurality of destination points by moving multiple times from the departure point, based on the order in which the worker passes through the plurality of destination points by the shortest route. Accordingly, the worker can go around the plurality of destination points by the shortest route, and the moving body can go around the plurality of destination points, based on the order in which the worker goes around the plurality of destination points while returning to the departure point halfway. Therefore, it is possible to shorten movement time of the worker and perform delivery without causing shortage of loaded articles or shortage of a battery remaining amount of the moving body.

By shortening the movement time of the worker, for example, the period of time from when the moving body arrives at the destination point to when the worker arrives at the destination point and starts the work is shortened, and the time required for the entire work can be shortened. Further, when the worker is a person, fatigue of the worker can be reduced by shortening the movement time of the worker. In this way, it is possible to improve efficiency of the work in which the moving body and the worker cooperate with each other.

(2) The route generation method according to (1),

- in which the route is a route for passing through the plurality of destination points in an order identical to the order acquired in the first step.

According to (2), the worker can go around the plurality of destination points along the shortest route, and the moving body can go around the plurality of destination points in the same order as the worker while returning to the departure point halfway.

(3) The route generation method according to (1) or (2),

- in which in the first step, the computer generates the order based on information indicating positions of the plurality of destination points.

According to (3), it is possible to generate the shortest route along which the worker goes around the plurality of destination points.

(4) The route generation method according to any one of (1) to (3),

- in which the route is a route along which the moving body delivers articles at the departure point to the plurality of destination points.

According to (4), it is possible to improve efficiency of the delivery work by the moving body and the worker.

(5) The route generation method according to (4),

- in which in the second step, the computer generates the route, based on a quantity of the articles capable of being loaded onto the moving body at the departure point, and a quantity of the articles to be delivered to each of the plurality of destination points.

According to (5), it is possible to generate the route of the moving body under the constraint condition that the moving body returns to the departure point when no article is to be loaded, and to prevent shortage of the loaded articles.

(6) The route generation method according to any one of (1) to (5),

- in which in the second step, the computer generates the route, based on information indicating a distance by which the moving body is continuously movable from a charging point at which the moving body is charged, and information indicating positions of the departure point, the plurality of destination points, and the charging point.

According to (6), it is possible to generate the route of the moving body under the constraint condition that the moving body is not allowed to move due to running out of the battery remaining amount while moving, and to prevent the shortage of the battery remaining amount.

(7) The route generation method according to any one of (1) to (6),

- in which in the second step, the computer generates the route, based on information indicating a distance between points including the departure point and the plurality of destination points, and information indicating a speed of the moving body between the points.

According to (7), the moving body can go around the plurality of destination points in a short time based on the order in which the worker goes around the plurality of destination points.

(8) The route generation method according to any one of (1) to (7),

- in which the moving body includes a plurality of moving bodies, and
- the route is each route of the plurality of moving bodies along which the plurality of moving bodies share and pass through the plurality of destination points.

According to (8), the plurality of moving bodies move to the plurality of destination points in a shared manner, and the work efficiency can be improved.

(9) The route generation method according to (8),

- in which each route of the plurality of moving bodies is a route along which the plurality of moving bodies do not pass through a same point in different directions.

According to (9), even when movement of the plurality of moving bodies is performed in a temporally overlapping manner, it is possible to avoid the plurality of moving bodies passing each other. Therefore, it is possible to suppress a collision accident due to a delay caused by a passing operation of the plurality of moving bodies or an error in the passing operation of the plurality of moving bodies.

REFERENCE SIGNS LIST

10, 10A, 10B: autonomous mobile robot (moving body)
11, 21 processor (computer)
N1 to N12: delivery destination (a plurality of destination points)
S: departure point
S72, S132: step (first step)
S73, S133: step (second step)

The invention claimed is:

1. An operation method causing a computer to execute:

a first step of acquiring an order in which a moving body passes through a plurality of destination points by a shortest route after departing from a departure point, the moving body capable of loading an article;

a second step of generating a route of the moving body for passing through the plurality of destination points by moving multiple times from the departure point, based on the order acquired in the first step, under a constraint condition that the moving body returns to the departure point when no article is to be loaded;

a third step of dividing the route into a plurality of robot routes;

a fourth step of distributing and setting the plurality of robot routes to a plurality of moving bodies so that each moving body of the plurality of moving bodies moves along a corresponding set route of the plurality of robot routes; and a fifth step of transmitting robot route information indicating each robot route set in the fourth step to each of the plurality of moving bodies for which the robot route set in the fourth step is distributed, in wireless communication, wherein each of the plurality of moving bodies autonomously moves along the robot route indicated by the robot route information transmitted in the fifth step to deliver an article to each delivery destination among the plurality of destination points, and the moving multiple times is an autonomous movement departing from the departure point and returning to the departure point at least once halfway.

2. The operation method according to claim 1, wherein the route is a route for passing through the plurality of destination points in an order identical to the order acquired in the first step.

3. The operation method according to claim 1, wherein in the first step, the computer generates the order based on information indicating positions of the plurality of destination points.

4. The operation method according to claim 1, wherein the route is a route along which the moving body delivers articles at the departure point to the plurality of destination points.

5. The operation method according to claim 4, wherein in the second step, the computer generates the route, based on a quantity of the articles capable of being loaded onto the moving body at the departure point, and a quantity of the articles to be delivered to each of the plurality of destination points.

6. The operation method according to claim 1, wherein in the second step, the computer generates the route, based on information indicating a distance by which the moving body is continuously movable from a charging point at which the moving body is charged, and information indicating positions of the departure point, the plurality of destination points, and the charging point.

7. The operation method according to claim 1, wherein in the second step, the computer generates the route, based on information indicating a distance between points including the departure point and the plurality of destination points, and information indicating a speed of the moving body between the points.

8. The operation method according to claim 1, wherein the route is each route of the plurality of moving bodies along which the plurality of moving bodies share and pass through the plurality of destination points.

9. The operation method according to claim 1, wherein the route is a route along which the plurality of moving bodies do not pass through a same point in different directions.

* * * * *